US 12,152,953 B2

(12) United States Patent
Monichino

(10) Patent No.: US 12,152,953 B2
(45) Date of Patent: Nov. 26, 2024

(54) PRESSURE SENSOR HAVING A SENSOR BODY ARRANGEMENT INCLUDING MEMBRANE AND CIRCUIT ARRANGEMENTS

(71) Applicant: METALLUX SA, Mendrisio (CH)

(72) Inventor: Massimo Monichino, Mendrisio (CH)

(73) Assignee: METALLUX SA, Mendrisio (CH)

( * ) Notice: Subject to any disclaimer, the term of this patent is extended or adjusted under 35 U.S.C. 154(b) by 313 days.

(21) Appl. No.: 17/754,963

(22) PCT Filed: Oct. 15, 2020

(86) PCT No.: PCT/IB2020/059707
§ 371 (c)(1),
(2) Date: Apr. 18, 2022

(87) PCT Pub. No.: WO2021/074846
PCT Pub. Date: Apr. 22, 2021

(65) Prior Publication Data
US 2022/0381634 A1 Dec. 1, 2022

(30) Foreign Application Priority Data
Oct. 18, 2019 (IT) .................. 102019000019274

(51) Int. Cl.
*G01L 9/00* (2006.01)
(52) U.S. Cl.
CPC ............ *G01L 9/0052* (2013.01); *G01L 9/007* (2013.01); *G01L 9/0072* (2013.01); *G01L 9/008* (2013.01)

(58) Field of Classification Search
None
See application file for complete search history.

(56) References Cited

U.S. PATENT DOCUMENTS 7,578,196 B2 * 8/2009 Riccoti ................. G01L 9/0045
73/754
9,021,885 B2 * 5/2015 Seto ...................... G01L 9/0083
73/727

(Continued)

FOREIGN PATENT DOCUMENTS

EP 3098584 A1 11/2016
WO 2007/010570 A1 1/2007

(Continued)

OTHER PUBLICATIONS

International Search Report and Written Opinion of International Application No. PCT/IB2020/059707, mailed Dec. 12, 2020.

*Primary Examiner* — Peter J Macchiarolo
*Assistant Examiner* — Jermaine L Jenkins
(74) *Attorney, Agent, or Firm* — Heslin Rothenberg Farley & Mesiti P.C.; Victor A. Cardona, Esq.

(57) ABSTRACT

A sensor for detecting the pressure of a fluid includes a sensor body having a membrane subject to elastic flexure as a result of the pressure of the fluid, and an electrical circuit configured for measuring an elastic flexure or deformation of the membrane portion. A detection element is prearranged for interacting with the electrical circuit when an elastic flexure of the membrane portion is of a degree at least equal to a safety limit, to generate thereby information representative of an excessive pressure of the fluid or an anomalous state of the device.

19 Claims, 17 Drawing Sheets

(56) References Cited

U.S. PATENT DOCUMENTS

| | | | |
|---|---|---|---|
| 9,759,620 B2* | 9/2017 | Monichino | G01L 19/148 |
| 10,627,301 B2* | 4/2020 | Monichino | G01L 9/0051 |
| 11,385,118 B2* | 7/2022 | Frye | G01L 19/0061 |
| 2012/0104518 A1* | 5/2012 | Salmaso | G01L 9/0042 |
| | | | 438/51 |
| 2017/0292887 A1 | 10/2017 | Schmidt et al. | |

FOREIGN PATENT DOCUMENTS

| | | |
|---|---|---|
| WO | 2007/032032 A1 | 3/2007 |
| WO | 2008/078147 A2 | 7/2008 |
| WO | 2014/097255 A2 | 6/2014 |

* cited by examiner

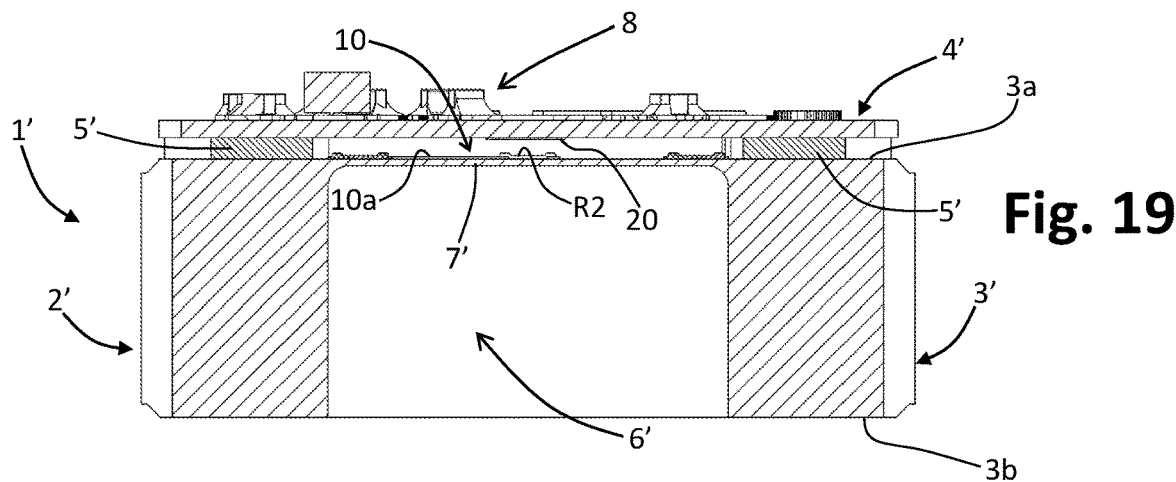
Fig. 19
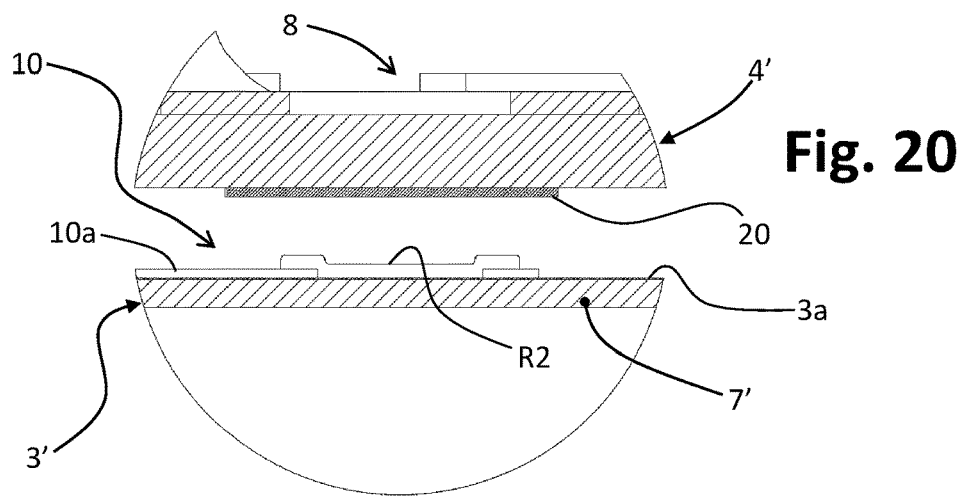
Fig. 20
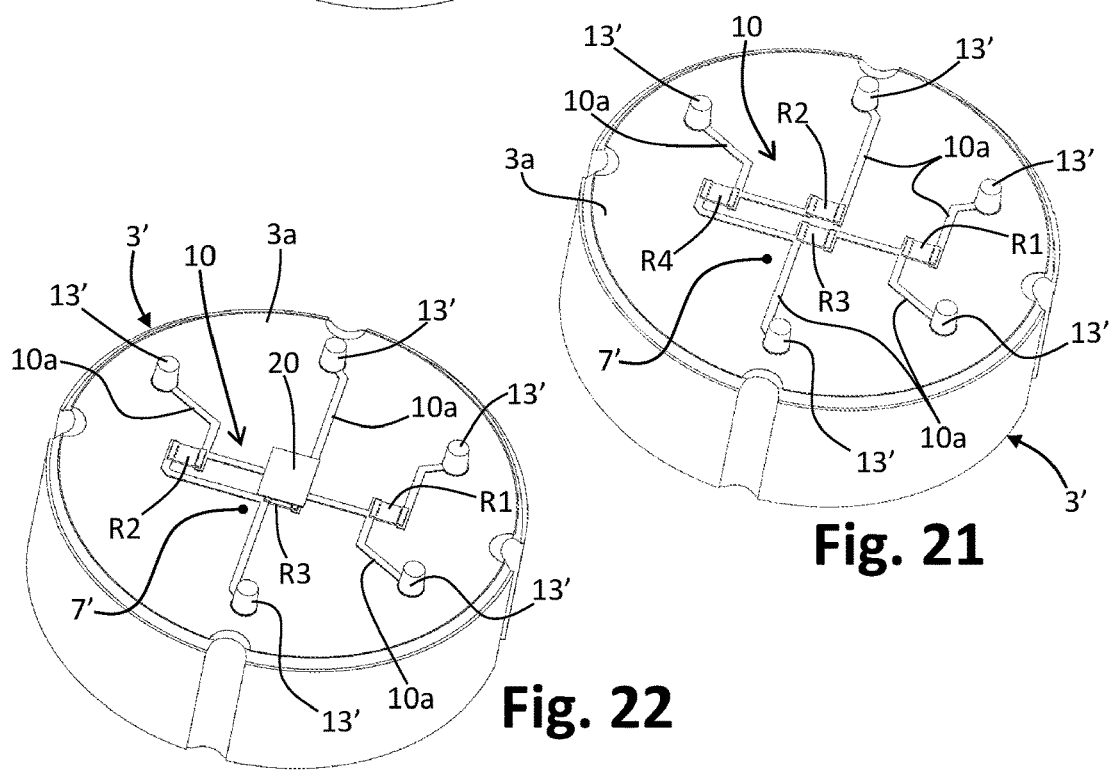
Fig. 21
Fig. 22

Fig. 23
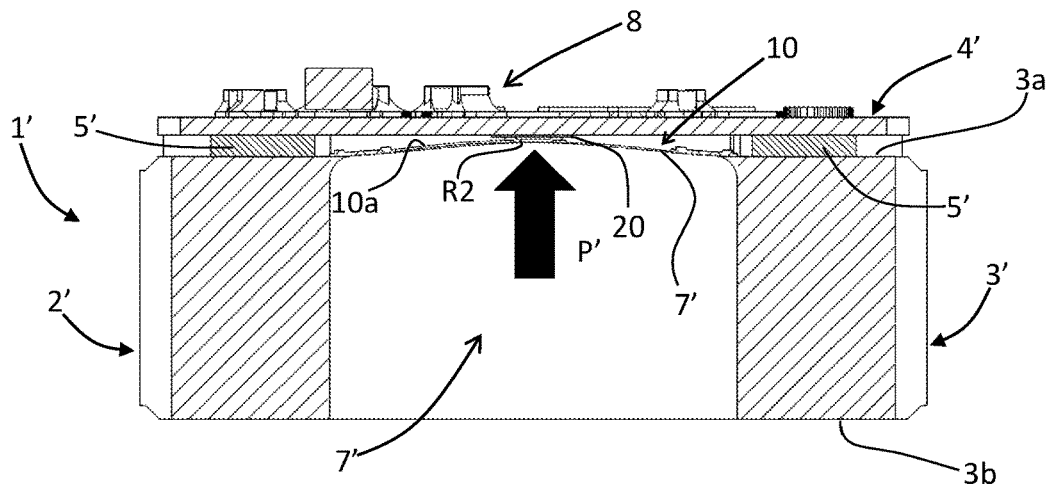
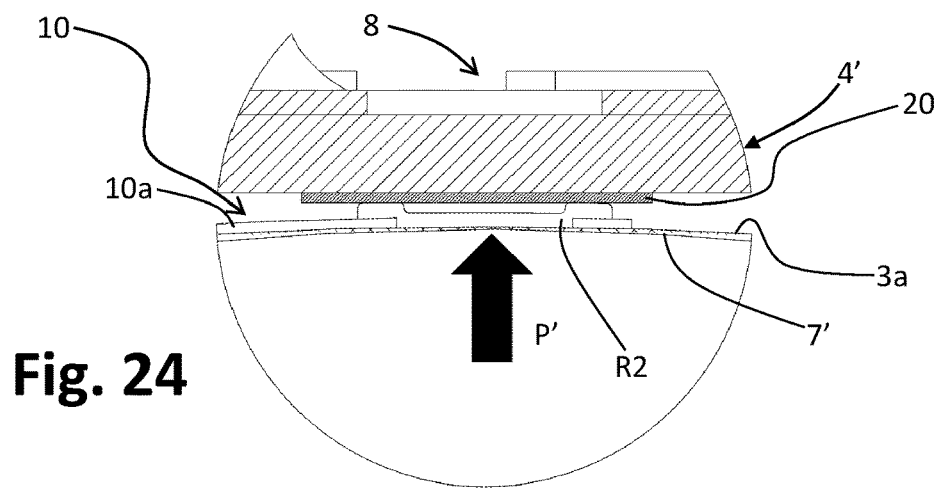
Fig. 24
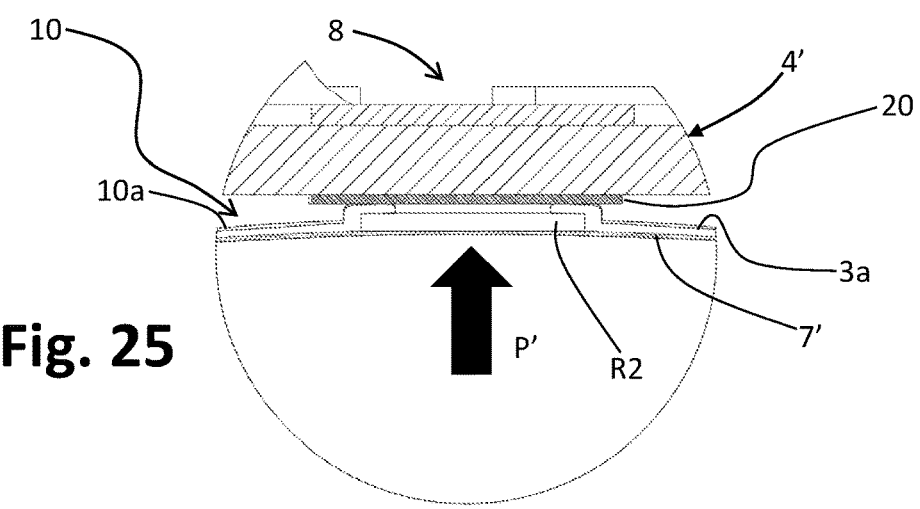
Fig. 25

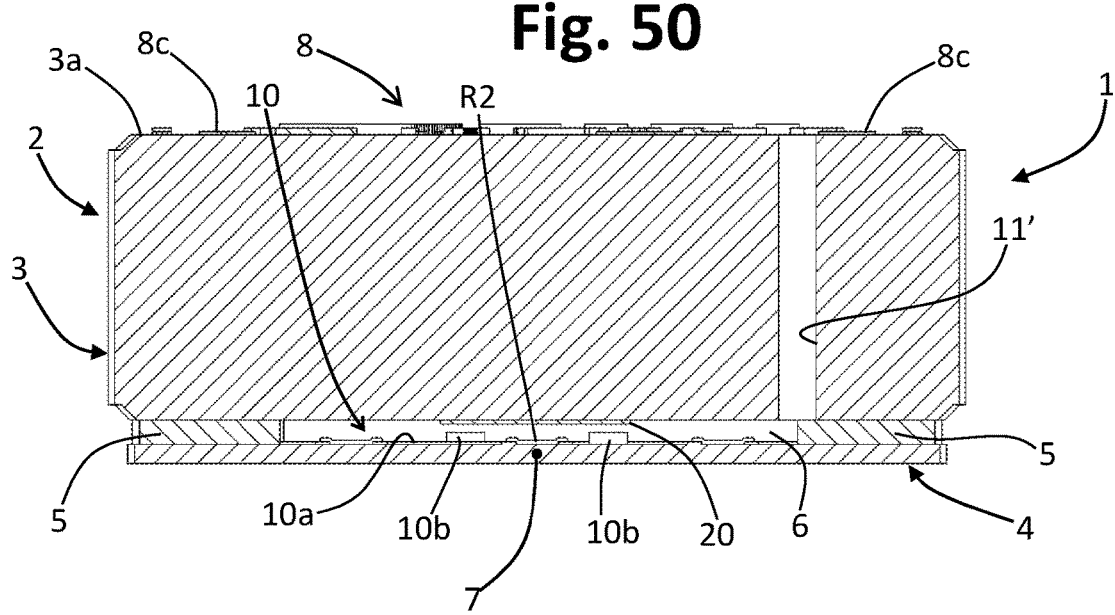
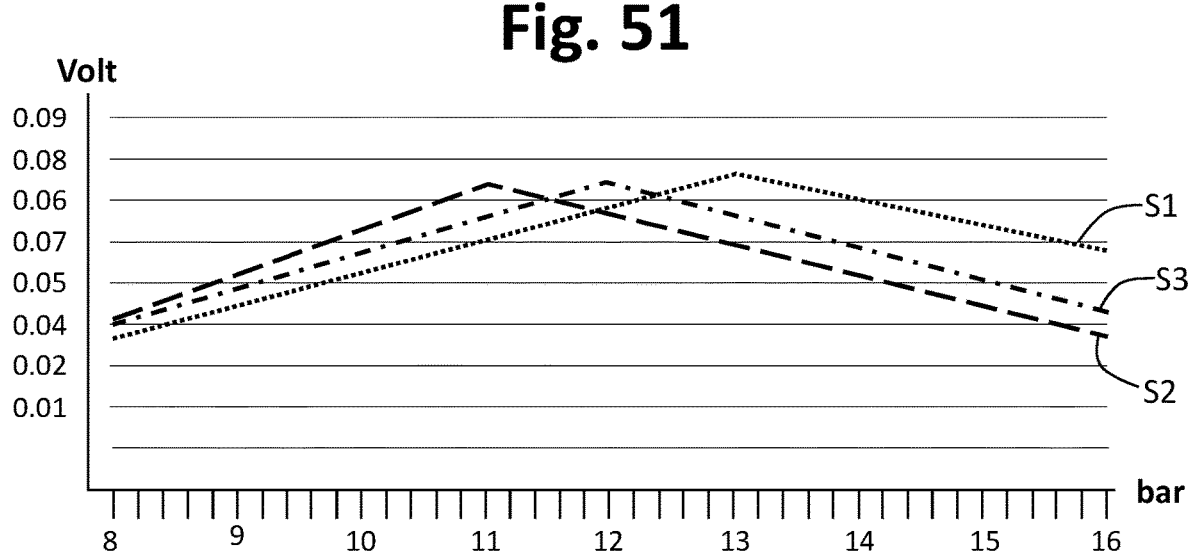

PRESSURE SENSOR HAVING A SENSOR BODY ARRANGEMENT INCLUDING MEMBRANE AND CIRCUIT ARRANGEMENTS

CROSS REFERENCE TO RELATED APPLICATIONS

This application is a national stage filing under Section 371 of International Application No. PCT/IB2020/059707, filed Oct. 15, 2020, published in English on Apr. 22, 2021 as WO 2021/074846 and which claims priority from Italian Patent Application No. 102019000019274 filed on Oct. 18, 2019, the entire disclosure of which is incorporated herein by reference.

FIELD OF THE INVENTION

The present invention relates to pressure sensors and has been developed with particular reference to sensors having a sensor body provided with a membrane portion, subject to elastic flexure or deformation as a result of a fluid, the pressure of which is to be measured.

PRIOR ART

Sensors of the type indicated are used in devices for detecting the pressure of fluids (liquids and gases) in various sectors, such as the automotive sector, the domestic sector and the sector of electrical household appliances, the heating, ventilation and air conditioning sector, and hydro-sanitary sector in general, etc. These detection devices typically comprise a casing or a support, defining at least one housing with an inlet for a fluid the pressure of which is to be measured, as well as a pressure sensor in the housing, so that a membrane portion thereof is exposed to the fluid.

The sensor has a sensor body, in general made of electrically insulating material, with a cavity that is closed at at least one end by the aforesaid membrane portion. In some types of sensor (for example, some sensors of a relative type), the axial cavity is substantially a blind axial cavity, closed only at a face of the sensor body, here defined for simplicity as "upper face".

The above axial cavity opens, instead, at the opposite face of the sensor body, here defined as "lower face", and is designed to be set in communication with the inlet of the device, in order to receive the fluid. In other types of sensor (for example, some sensors of an absolute type), the cavity is, instead, substantially closed at both of its opposite ends, at one of these ends there being provided the membrane portion, the outer side of which is exposed to the fluid.

Irrespective of the type of sensor, the sensor body may be monolithic or else made up of a number of parts. For instance, the sensor body may be monolithic in order to define in a single piece the blind cavity with the corresponding membrane portion, or else comprise an axially hollow body, fixed to the upper face of which is a relatively thin element, which defines the membrane portion, in order to close the aforesaid cavity at one end. In other solutions in which the sensor body is made up of a number of parts, a main body is provided, which defines integrally a blind cavity, closed at the upper face by a portion of the body itself, and closed at the lower face by an element that defines the membrane portion, applied to the main body. Possibly, the aforesaid main body may envisage a hole for setting the cavity in communication with the external environment. In other sensors still, two body parts are joined together by means of an annular layer consisting of a fixing material, having a certain thickness, so that the cavity of the sensor body is delimited in an axial direction by the two facing surfaces of the two body parts, and is delimited peripherally by the annular layer of fixing material: in these cases, one of the two body parts does not necessarily have to define a respective cavity.

In sensors of the type referred to, detection of the pressure is obtained by exploiting the elastic flexure or deformability of the membrane portion, caused by the action of the fluid to be detected. The degree of the flexure or deformation, which is representative of the pressure of the fluid, is measured electrically via suitable circuit means provided directly on the membrane portion, these means usually being of a piezoelectric type, or else of a piezoresistive type, or else of a resistive type, or else of a capacitive type.

The membrane portion and the detection circuitry provided thereon represent elements of criticality of the sensor, in particular if they are subject to excessive mechanical stresses due to the pressure of the fluid. Such stresses may, for example, be caused by occasional over-pressures of the fluid to be detected, or else by an increase in volume of the fluid due to freezing thereof: in these circumstances it is possible to bring about an excessive bending of the membrane portion, such as to cause failure thereof and/or interruption of the electrical-connection tracks deposited thereon, which belong to the detection circuit. These problems of a mechanical type are in general solved by providing the pressure sensor, or the device that integrates it, with suitable mechanical compensation elements, for example as described in WO 2008/078184 A.

The present Applicant has, however, found that, in some types of pressure sensor, an excessive stress by the fluid on the membrane portion—i.e., an excessive pressure—may occasionally give rise to imprecise detections, even without bringing about a failure of the sensor itself or parts thereof.

For instance, as already mentioned, some pressure sensors are prevalently made up of a monolithic body substantially without a blind cavity, on the lower face of which there is sealingly applied—via an annular layer of suitable material, for example an adhesive—the element that defines the membrane portion. In this way, the material that sealingly joins the two parts peripherally delimits a cavity. With such a configuration, the element that defines the membrane portion is substantially set parallel to the lower face of the monolithic body, at a certain distance therefrom. This distance, which depends upon the thickness of the layer of the fixing material, is in general relatively modest (of the order of tens of micrometres).

In these sensors, the sensor body typically supports a circuit arrangement, having a first part that includes a first electrical-circuit pattern, made of electrically conductive material deposited on the upper face of the monolithic body, to which various circuit components may be connected for treatment of the signal representative of the pressure value (for example, for the purposes of amplification or processing). The electrical signal representative of the pressure value is, instead, obtained from a second part of the circuit arrangement, including a second electrical-circuit pattern, which provides, or connected to which are, the means designed to detect flexure or deformation of the membrane portion, for example a series of electrical resistances connected to form a Wheatstone bridge. The two circuit patterns are electrically connected together via connection elements, which extend in an axial direction of the sensor body: these connection elements frequently include at least through holes in the monolithic body, which extend axially between its two opposite faces, provided on the inside of which is an electrically conductive material in contact with both of the circuit patterns.

The second electrical-circuit pattern, for example the aforesaid Wheatstone bridge, is formed on the "inner" face of the element that defines the membrane portion, i.e., the face that is to face the inside of the cavity of the sensor body (or, in other words, the face of the membrane element opposite to the one that is to be exposed to the fluid). As has been said, the aforementioned inner face is relatively close to the lower face of the monolithic body.

The present Applicant has, for example, found that, in sensors of the type referred to, an excessive flexure of deformation of the membrane portion, due to an excessive pressure of the fluid, may occasionally bring about a contact between the central region of the aforesaid membrane portion and the lower face of the monolithic body, or with its parts in relief, and the aforesaid contact may give rise to marked errors of detection of the pressure value.

AIM AND SUMMARY OF THE INVENTION

The present invention has basically the aim of o providing a pressure sensor having a simple, inexpensive, and reliable structure, which enables to solve the problem referred to above. This and other aims still, which will emerge clearly hereinafter, are achieved according to the invention by a pressure sensor and by a device integrating such a pressure sensor, having the characteristics referred to in the annexed claims, which form an integral part of the technical teaching provided herein in relation to the invention.

BRIEF DESCRIPTION OF THE DRAWINGS

Further aims, characteristics, and advantages of the present invention will emerge clearly from the ensuing detailed description and from the annexed drawings, which are provided purely by way of explanatory and non-limiting example and in which:

FIG. 19 is a schematic cross-sectional view according to the line XIX-XIX of FIG. 18;

FIG. 20 is a detail at an enlarged scale of FIG. 19;

FIGS. 21 and 22 are schematic perspective views of the sensor of FIGS. 17-18, with some parts removed;

FIG. 23 is a schematic cross-sectional view similar to that of FIG. 19, with the sensor in a different condition;

FIG. 24 is a detail at an enlarged scale of FIG. 23;

FIG. 25 is a view similar to that of FIG. 24, regarding a possible variant embodiment;

FIG. 50 is a schematic cross-sectional view of a sensor including the part of FIG. 49; and FIG. 51 is a schematic graphic representation aimed at exemplifying possible pressure-detection errors of sensors according to the prior art.

DESCRIPTION OF PREFERRED EMBODIMENTS OF THE INVENTION

Figure 1:
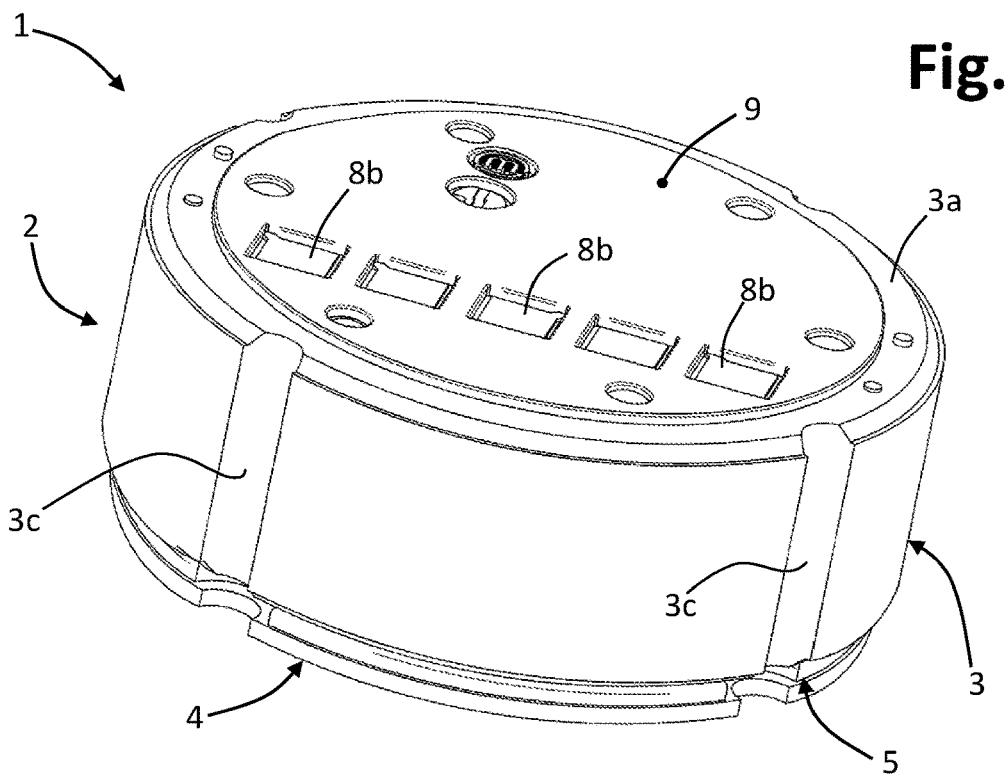
FIG. 1 is a schematic perspective view of a pressure sensor according to possible embodiments.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment", "in one embodiment", and the like, that may be present in various points of this description do not necessarily refer to one and the same embodiment. Moreover, particular conformations, structures, or characteristics defined in the framework this description may be combined in any adequate way in one or more embodiments, even different from the ones represented. The reference numbers and spatial references (such as "upper", "lower", "top", "bottom", etc.) used herein are provided merely for convenience and hence do not define the sphere of protection or the scope of the embodiments. In the present description and in the attached claims, the generic term "material" must be understood as including mixtures, compositions, or combinations of a number of different materials (for example, multilayer structures or composite materials).

In general terms, the pressure sensor according to the invention has a sensor body with a cavity that is closed at at least one end by a membrane portion. The sensor body comprises at least two body parts, at least one of which defines a respective membrane portion, associated to which is a deformation-detection circuit. The sensor body, or each of the at least two body parts that make it up, is preferably made of electrically insulating material, such as a ceramic material, for example alumina; not on the other hand ruled out is the use of an electrically conductive material, for example a metal, for the production of one or more parts of the sensor body, coated at least in part with an electrically insulating material.

In a first type of sensor according to the invention, the two body parts are joined together by means of an additional fixing material so that the two body parts have respective first faces facing one another. In this way, the aforesaid first faces and the fixing material delimit a cavity, the height of which depends upon the thickness of the layer of fixing material. Associated on the inner side of the membrane portion, i.e., its first face facing the inside of the cavity, is the deformation-detection circuit, whereas its outer side is exposed to the fluid. In sensors of this type, one of the two body parts may also define a respective recess in its first face, which defines at least part of the cavity: consequently, in such sensors variants, the depth of the cavity also depends upon the depth of the aforementioned recess.

In sensors of the aforesaid first type, the cavity of the body sensor may be closed hermetically, via the fixing material. A substantially similar structure may, on the other hand, be used also to provide pressure sensors of a second type according to the invention, where the cavity of the sensor body is set in fluid communication with the external environment, for example via a through hole of one of the body parts, in particular a body part different from the one that defines the membrane portion. The through hole hence provides a duct that, if need be, may be used for providing a reference pressure, on the side of the membrane portion internal to the cavity, with respect to the pressure to be measured that acts on the outer side of the membrane portion itself. This solution may for example be adopted to perform differential pressure detections of the fluid, in particular with respect to the ambient pressure.

In a third type of pressure sensors according to the invention, one of the two body parts defines a blind axial cavity, i.e., a cavity closed at one end thereof by the membrane portion. The body part in question is preferably of a monolithic type, even though this does not constitute an essential characteristic. The opposite end of the axial cavity is, instead, open in order to be able to receive the fluid. In these sensors, the second body part is fixed to the first body part substantially at the membrane portion, at a distance therefrom, and supports, for example, part of a circuit arrangement. Also in these cases, then, the two body parts have respective first faces facing one another, to the first face of the body part that defines the membrane portion there being associated the detection circuit.

The sensor according to the invention may in any case be obtained in forms or versions different from the ones exemplified above.

As has been said, the sensor body includes at least two parts fixed to one another, which in turn may be monolithic or else formed by a number of assembled components. For instance, with reference to the sensors of the third type referred to above, the body part defining the membrane portion may be monolithic so as to define in a single piece also the corresponding blind axial cavity; however, the aforesaid body part may also be formed by a first axially hollow component, i.e., having a through hole, sealingly fixed to an end face of which is a second relatively thin component, which defines the membrane portion and closes the through hole at one end.

In FIG. 1, designated as a whole by 1 is a pressure sensor according to possible embodiments of the present invention, in particular of the first type referred to above.

In the embodiment exemplified, the sensor 1 has a sensor body designated as a whole by 2. In various embodiments, the body 2 is made up of a number of parts, comprising at least one first body part, designated by 3, and one second body part, designated by 4. In the example represented, the two parts 3 and 4 are sealingly joined together via suitable means, here represented by a layer of fixing material 5, for example an adhesive or a sinterable material, so that a first face (here the lower face) of the part 3 faces a corresponding first face (here the upper face) of the part 4, at a distance therefrom. The layer 5 has an annular shape and is set between the lower face of the part 3 and the upper face of the part 4. In this way, defined between the two body parts 3, 4 is a cavity or chamber, here of a sealed type, designated by 6, for example in FIG. 6.

In various embodiments, the part 3 is substantially monolithic, even though this is not essential, and is relatively thick, whereas the part 4 is comparatively thinner and defines, at least in a central region thereof, an elastically deformable membrane portion, designated by 7, for example in FIGS. 3-6. The body parts 3 and 4 are preferentially made of an electrically insulating material, such as a ceramic material or the like (for example, alumina), or a polymeric material, but not excluded from the scope of the invention is the case where one or both of the parts 3 and 4 are made of an electrically conductive material (for example, a metal material) coated at least in part, where necessary, by a layer of electrically insulating material.

Figure 3:
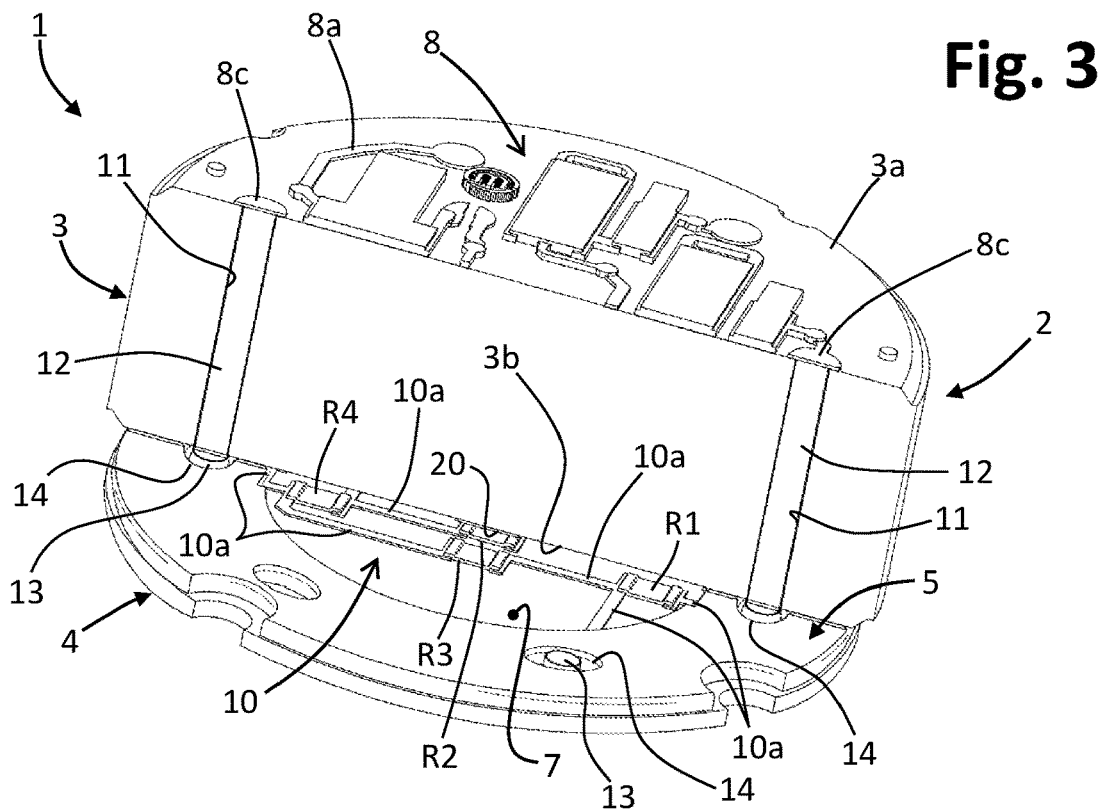
FIG. 3 is a schematic perspective and partially sectioned view of the sensor of FIG. 2.

The body part 3 preferably has a generally cylindrical shape, with two opposite faces designated by 3a and 3b, for example in FIG. 3, as well as some perimetral reference or positioning seats, some of which are designated by 3c only in FIG. 1. In various embodiments (not represented), the body part 3 may have a different shape, for example generally parallelepipedal or in any case prismatic. The body part 4 preferentially has a peripheral profile substantially congruent with that of the part 3, which is substantially circular in the example shown; in this example, the part 4 has substantially the shape of a disk, which provides at least in its central region the membrane portion 7 referred to above, which is subject to elastic flexure or deformation towards the body part 3, as a result of the fluid the pressure of which is to be detected.

The thicker or stiff body part 3 and the thinner and at least in part flexible body part 4 may possibly have a parallelepipedal shape, i.e., a substantially square or rectangular cross section; these shapes may, for example, be obtained by cutting a plurality of bodies 3 and 4 out of sheets of larger dimensions, which are respectively thicker and thinner, preferably by cutting the bodies 3 and 4 after the corresponding sheets have been fixed together.

The sensor 1 comprises a circuit arrangement supported by the sensor body 2, which—in various preferred embodiments—comprises at least two portions or circuits, each supported by a corresponding body part 3 and 4.

Figure 2:
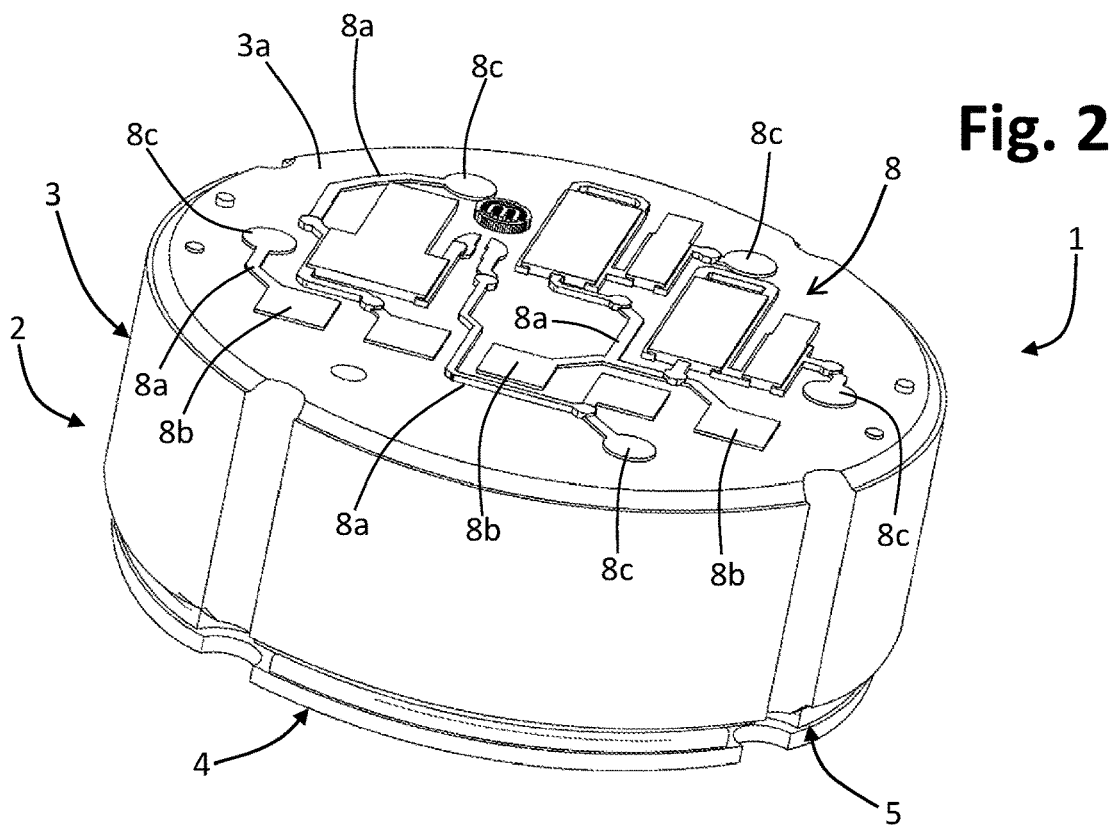
FIG. 2 is a schematic perspective view of the sensor of FIG. 1, with an upper protective layer removed.
Figure 4:
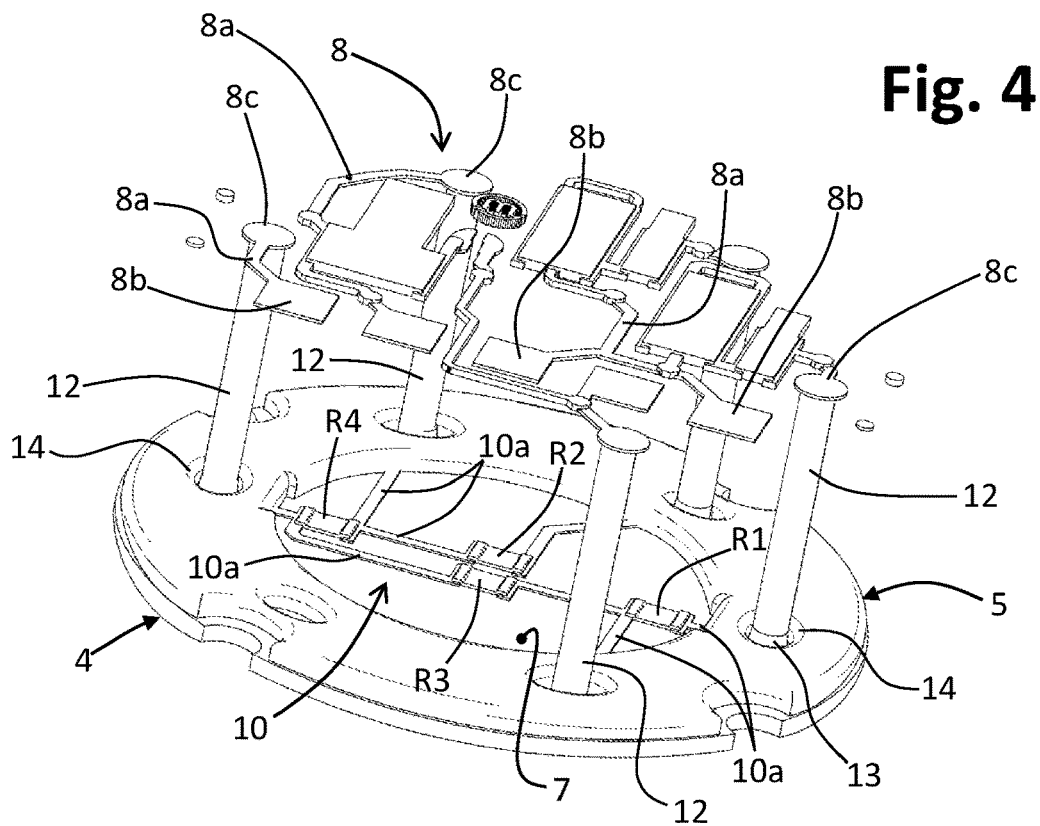
FIG. 4 is a schematic perspective view of the sensor of FIG. 2, with a monolithic body removed.
Figure 5:
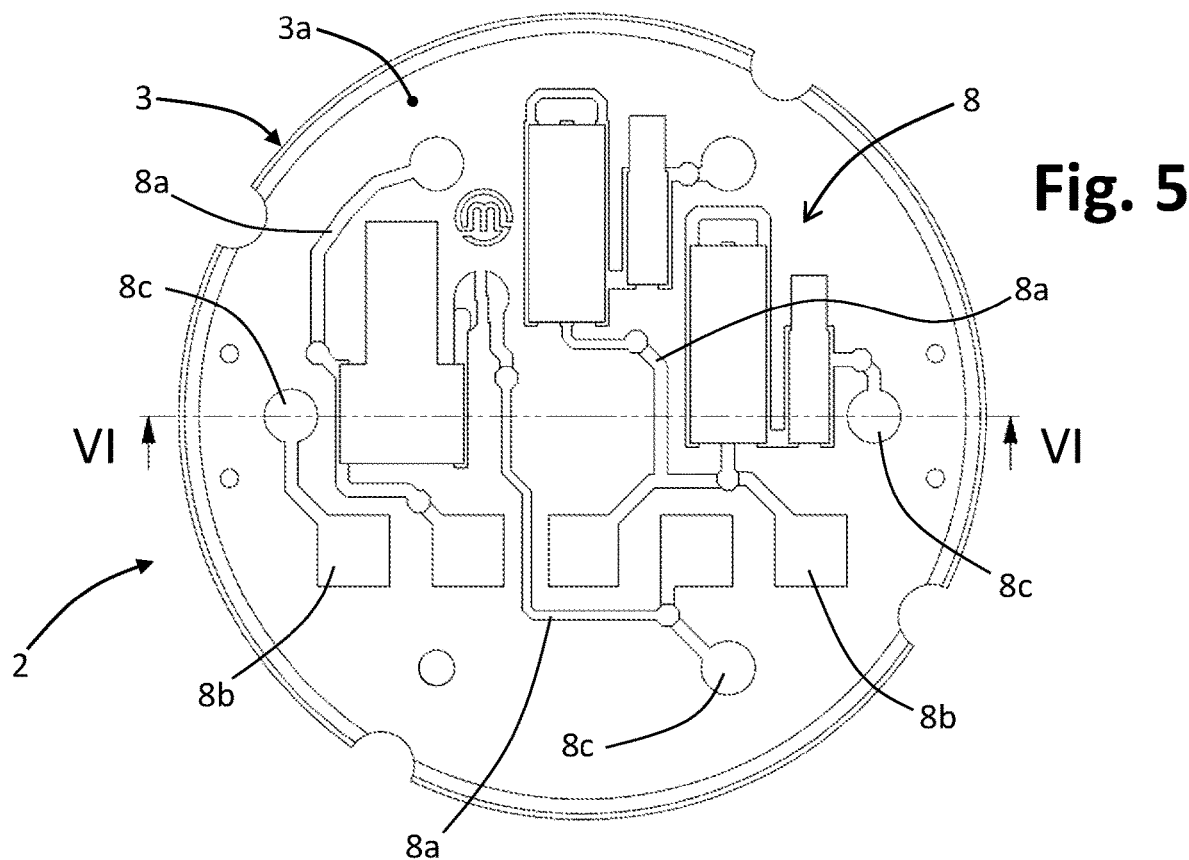
FIG. 5 is a schematic top plan view of the sensor of FIG. 2.

With reference, in particular, to FIGS. 2-4, in various embodiments the aforementioned circuit arrangement comprises an electrical circuit associated to the upper face 3a of the body part 3, designated as a whole by 8. The circuit 8 comprises a plurality of respective tracks of electrically conductive material, some of which are designated by 8a in FIGS. 2-5, and which are made, for example, of metal or a metal alloy (such as a silver-palladium alloy), it being possible for such tracks to be screen-printed or in any case deposited on the face 3a of the body part 3. In the preferred embodiment, then, an electrically insulating material constituting the part 3 is exploited directly as substrate for at least part of the circuit arrangement; however, as has been said, the face 3a could also be electrically conductive but coated, for example, with a layer of electrically insulating material, associated to which is the circuit 8.

The circuit 8 may include corresponding circuit components, for example components configured for the treatment of an electrical signal representative of first information, regarding a pressure value, for example for its filtering, amplification, processing, etc. Also one or more of the aforesaid components may be directly formed on the face 3a, such as for example screen-printed resistances.

In FIG. 2, designated by 8b are some connection pads, which come under corresponding conductive tracks 8a of the circuit 8, which are used for connection of the sensor 1 to a generic external system, for example an electronic control unit of an internal-combustion engine.

It should be noted that in FIG. 1 the circuit 8 and the corresponding circuit components are at least in part coated with a protective layer 9 made of electrically insulating material, such as a layer of polymeric or vitreous material, except for some areas in which the pads 8b (and possible further parts that are not to be covered) are located. Representation of the layer 9 is omitted in the other figures.

The circuit arrangement of the sensor 1 comprises in any case an electrical circuit, designated as a whole by 10 in FIGS. 3 and 4, which is associated to the upper face of the body part 4, i.e., in a position facing and at a distance from the lower face 3b of the body part 3 (see FIG. 3). As may be clearly noted in FIG. 4 (where the representation of the body part 3 has been omitted for greater clarity), the circuit 10 extends at least in part in a position corresponding to the membrane portion 7.

At least part of the circuit 10 is configured for detecting the elastic flexure or deformation of the membrane portion 7. This circuit part may be obtained according to any type known in the sector, preferably selected from among detection circuits of a resistive type, detection circuits of a piezoelectric type, detection circuits of a piezoresistive type.

Also the circuit 10 preferentially comprises a plurality of tracks made of electrically conductive material, for example a metal or a metal alloy (such as a silver-palladium alloy), some of which are designated by 10a in FIGS. 3 and 4, preferably deposited directly (for example, screen-printed) on the aforesaid upper face of the body part 4, as well as one or more detection-circuit components electrically connected to the tracks. Also one or more of the detection components may be directly formed on the aforesaid upper face of the body part 4, for example resistances, or piezoelectric elements, or piezoresistive elements, deposited via screen printing or some other deposition technique. Also in this case, as has been mentioned, the face considered of the body part 4 could be made of electrically conductive material, for example a metal material, but coated with an electrically insulating material at least on the portion on which the circuit 10 is present.

In the example, assume that the part of the circuit 10 that is to detect deformation of the membrane portion 7 is of a resistive type, in particular a piezoresistive type, and that it comprises four resistances, in particular piezoresistances, designated by R1, R2, R3, and R4, connected via the tracks 10a in a Wheatstone-bridge configuration, with at least two of the resistances (here the two central resistances of the bridge, designated by R3 and R4) that are located preferentially in a generally central position of the membrane portion 7. In what follows, the four resistances R1, R2, R3, and R4 will be also denoted as a whole as R1, . . . , R4.

In the example considered, the resistances R1, . . . , R4 forming part of the resistive detection bridge are hence made of resistive or piezoresistive material (for example, a resistive or piezoresistive paste) deposited on the upper face of the body part 4, on the membrane portion 7. A different and appropriate configuration may be adopted when the circuit components for detecting flexure are made of piezoelectric material.

The two circuits 8 and 10 are connected together by means of suitable electrical-connection elements, which extend in an axial direction of the sensor body 2. In a preferred embodiment, the means that connect the two circuits 8 and 10 comprise at least one electrically conductive material set in a plurality of through holes in the body part 3, which extend axially between the corresponding faces 3a and 3b. Two of such holes are designated by 11 only in FIG. 3, whereas designated by 12 is a corresponding filling made of electrically conductive material (see also FIG. 4). It should be noted that, instead of a filling, the electrically conductive material 12 present in the holes 11 could consist of a layer of material that extends over the inner surface of each hole 11, for its entire length and/or surface, as far as its two ends. Regardless of the specific technique used, the material 12 is applied preferentially in such a way that part of the metal or other electrically conductive material projects on the outside of the holes 11, at the corresponding ends.

In the example represented, as has been said, the holes 11 are filled with an electrically conductive material 12, for example a conductive paste, to form electrical tracks having a substantially cylindrical shape. Alternatively, as has been said, the material 12 could be set in the holes 11 in order to coat only the cylindrical surface of the latter, without filling them, for example via metallization processes. In addition or as an alternative, connection layers or conductive tracks that perform functions such as the ones described might possibly be provided at at least two of the axial grooves 3c of the body part 3 (FIG. 1).

As may be noted, for example in FIGS. 3 and 4, the conductive material 12 of each hole 11 is electrically in contact, at the upper face 3a of the part 3, with a respective terminal pad 8c connected to a track 8a of the circuit 8. On the lower face 3b of the body part 3, the material 12 is, instead, electrically connected to the circuit 10, for example to contact formations 13 made of electrically conductive material obtained on the upper face of the body part 4, these formations 13 being substantially axially aligned to the holes 11 and coming under corresponding tracks 10a of the circuit 10. In order to enable connection between the material 12 and the formations 13, the layer of fixing material 5 is provided with respective passages or through openings, some of which are designated by 14. The formations 13 may be obtained also after mutual fixing between the body parts 3 and 4, for example by exploiting the holes 11 and introducing therein an electrically conductive material that provides such formations 13.

According to an aspect of the invention, the face of the body part 3 that is set in front of the membrane portion 7 forms or has associated thereto at least one further circuit element configured for interacting with the electrical circuit present on the membrane portion, when the elastic flexure or deformation of the latter is of a degree at least equal to a substantially predetermined limit, to give rise to second information representative of an excessive pressure of the fluid, i.e., an excessive bending of the membrane portion 7.

In various embodiments, the aforesaid circuit element is exploited to yield a signal or a value of an electrical quantity that is indicative of an excessive pressure of the fluid and/or of an excessive bending of the membrane portion 7.

In various preferred embodiments, the aforesaid circuit element is configured for modifying the output signal of the electrical circuit that detects the deformation of the membrane portion, in a way clearly distinguishable and unequivocal: in this way, the same output signal of the detection circuit, designed to provide the aforesaid first information on the normal measurement of the pressure, may be exploited to infer second information on the condition of excessive pressure of the fluid, or else of excessive deformation of the membrane. The circuit element in question is a component that is functionally distinct from the detection circuit; i.e., it does not contribute to the effective measurement of the pressure, but is, instead, configured for "perturbing" or varying in a clearly distinguishable way the output signal of the detection circuit, in the case of excessive pressure, or else of an anomalous condition of the state of the pressure sensor.

The fact that one and the same output signal of the detection circuit, in particular a signal of an analog type, can provide both the value of measurement and an indication of anomalous condition, presents the advantage of being able to provide multiple information, albeit in the presence of a smaller number of electrical connections. The sensor according to the invention could, however, be provided with an appropriate circuit for controlling, processing, and transmitting data, for example in the form of a chip mounted on the sensor body, in order to transmit, if need be, a plurality of data in digital format (for example, serial data), which also contain the information on the value of measurement and anomalous conditions, or else the control circuit could carry out discrimination on a single measurement and status signal, separating it into the two components (pressure measurement and state of anomaly), and then supply it separately on respective electrical connections, to an external user circuit.

Preferentially, the pressure sensor 1 is prearranged for detecting pressures of the fluid comprised in a nominal working range, between a minimum pressure and a maximum pressure, with the electrical circuit for detecting deformation of the membrane that is configured for supplying an output signal representative of a pressure value of the fluid. The output signal is represented by an electrical quantity, for example a voltage, which can assume a value comprised in a range of nominal values, between a minimum value and a maximum value that correspond to the aforesaid minimum and maximum pressures, respectively. Contact between the aforesaid circuit element and the aforesaid part of the electrical detection circuit therefore determines a variation of the output signal such that the value of the corresponding electrical quantity is not comprised in the aforesaid range of nominal values.

To provide a specific example, assume merely by way of illustration that the sensor 1 is to operate in a nominal pressure range comprised between 8 bar and 13 bar, with the electrical quantity at output from the circuit that is a voltage comprised between 0.035 V and 0.065 V, corresponding, respectively, to the minimum value (8 bar) and to the maximum value (13 bar) of the nominal working range of the sensor. Contact between the circuit element provided according to the invention and the corresponding part of the detection circuit decidedly modifies the value of the output voltage, for example bringing it to 0.01 V, or else to 0.09 V, or in any case to a voltage value that is unequivocally distinguishable from the voltage values (for example, between 0.03 and 0.07 V) that are generated when the pressure of the fluid is comprised in the nominal working range of 8-13 bar.

With reference to the example so far described, the aforesaid circuit element, designated by 20 in FIG. 3, is associated to the face 3b of the body part 3 and is preferably constituted by an electrically conductive element, this definition being understood as including also electrically resistive elements.

As may be appreciated from FIG. 3, the element 20, in particular in the form of a contact or plate or pad, is associated to the face 3b of the body part 3 so as to overlie at least in part the circuit 10, at a distance therefrom. The element 20 may for example be glued to the face 3a, or else obtained via deposition on the face of an electrically conductive material (including a resistive material), for example via screen printing.

In various embodiments, the circuit element 20 is set in a region of the face 3b substantially corresponding to a central region of the membrane portion 7, even though this does not constitute an essential characteristic. In the case where the face 3b is not plane, the element 20 may be associated to a portion in relief of the aforesaid face. In the case where the body part 3 is not monolithic, in particular being formed by a number of components assembled together, the element 20 may be associated to one of such components that is located in a position generally facing the body part 4.

In various embodiments, such as the one so far considered, the circuit element 20 is arranged so as to be contacted by a part of the electrical circuit 10, following upon an aforesaid elastic flexure or deformation of the membrane portion 7 having a degree at least equal to the aforesaid substantially predetermined limit. In various preferred embodiments, where the detection circuit comprises a Wheatstone bridge, the element 20 is in a position substantially corresponding to at least one of the two central resistances R2, R3 of the bridge, in particular having as reference the axial direction of the sensor.

In order to facilitate understanding of operation of the circuit element 20 reference may be made to FIGS. 6-11.

Figure 6:
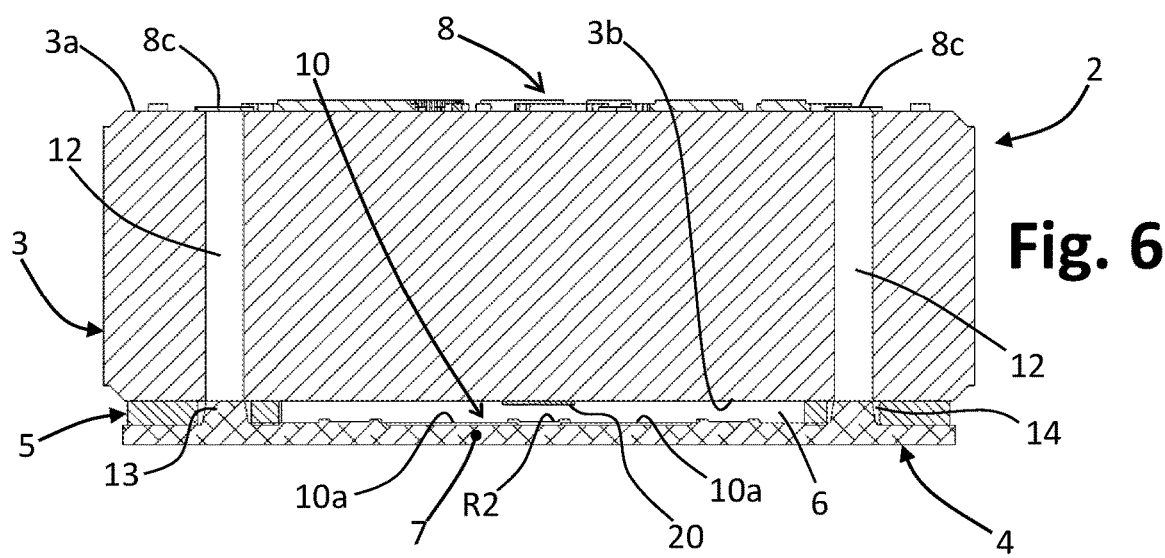
FIG. 6 is a schematic cross-sectional view according to the line VI-VI of FIG. 5, with the sensor in a first condition.

FIG. 6, where the body 2 is represented schematically in cross-sectional view, illustrates an inoperative condition or a resting condition of the sensor, i.e., a condition where the fluid does not impinge upon the "outer" side of the membrane portion 7 (i.e., the lower face of the body part 4), or else impinges thereon with a non-significant pressure, i.e., a pressure insufficient for determining an appreciable deformation of the portion 7; the pressure of the fluid is hence zero, or in any case lower than the lower limit of the nominal working range of the sensor. The membrane portion 7 is in a substantially resting condition, for example substantially plane and parallel with respect to the lower face 3a of the body part 3, with the circuit 10 at a distance from the face 3a and from the element 20, as may be noted also from the detail of FIG. 7. As has been said, the circuit element 20 overlies at least part of the circuit 10: assume, for example, that this part corresponds to the resistance R2.

Figure 8:
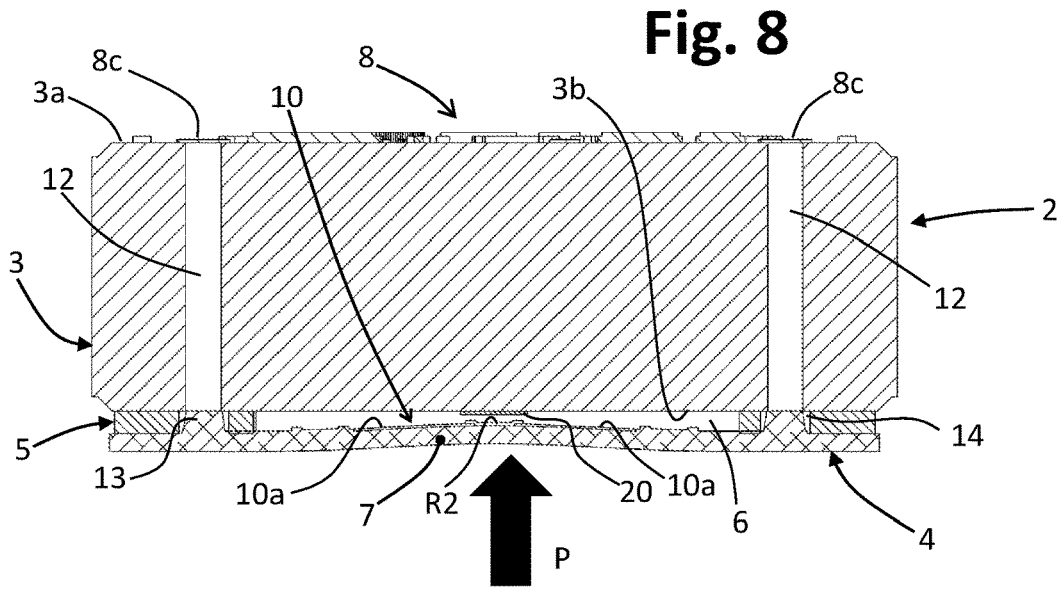
FIGS. 8 and 9 are views similar to those of FIGS. 6-7, with the sensor in a second condition.

FIG. 8 illustrates, instead, a working condition in which acting on the outer side of the membrane portion 7 is a pressure P of the fluid that falls within the nominal working range of the sensor, which here again may be assumed as being comprised between 8 and 13 bar (obviously the working range may vary according to the class of sensor).

Figure 9:
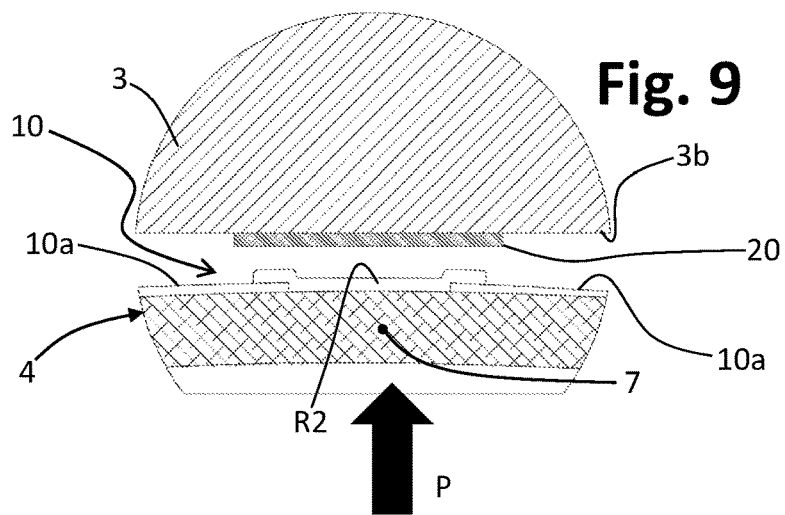

The pressure P is such as to cause an elastic deformation of the membrane portion 7, which bends towards the face 3b, but without coming into contact therewith or with the circuit 10, as may be noted also from the detail of FIG. 9. Deformation of the membrane portion 7 causes a deformation also of one or more of the resistances R1, ..., R4 of the detection circuit, in particular at least the resistances R2 and R3 that are located in the central region of the membrane portion 7: this deformation causes a variation of the resistance value of R2 and R3, determining a consequent variation of the output signal of the detection circuit R1, ..., R4, preferably a voltage signal.

The above variation of the output signal, such as the variation of the voltage value, with respect to the resting value generated in the condition of FIG. 6, is hence representative of the pressure P generated by the fluid. The signal reaches the circuit 8, via the connection means represented by the axial tracks formed by the material 12, where it is possibly treated and made available to an external system, via the pads 8b (FIG. 1).

Figure 10:
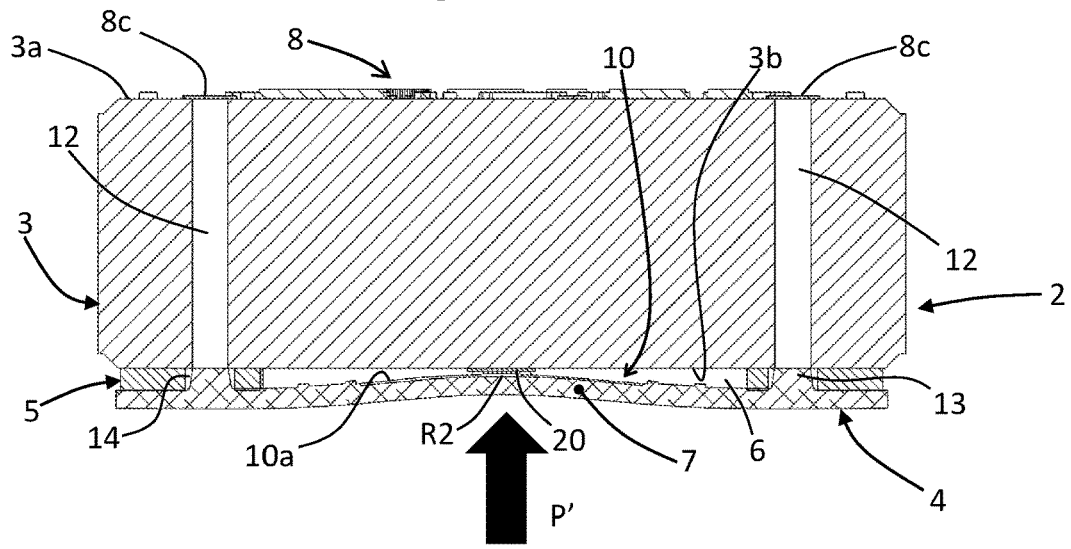
FIGS. 10 and 11 are views similar to those of FIGS. 6-7 and 8-9, with the sensor in a third condition.

FIG. 10 illustrates, instead, an anomalous condition, where on the outer side of the membrane portion 7 there acts an excessive pressure P' of the fluid, i.e., a pressure that exceeds the nominal working range of the sensor, for example a pressure of 14 bar, with reference to the non-limiting example referred to above that regards a working range comprised between 8 bar and 13 bar.

Figure 11:
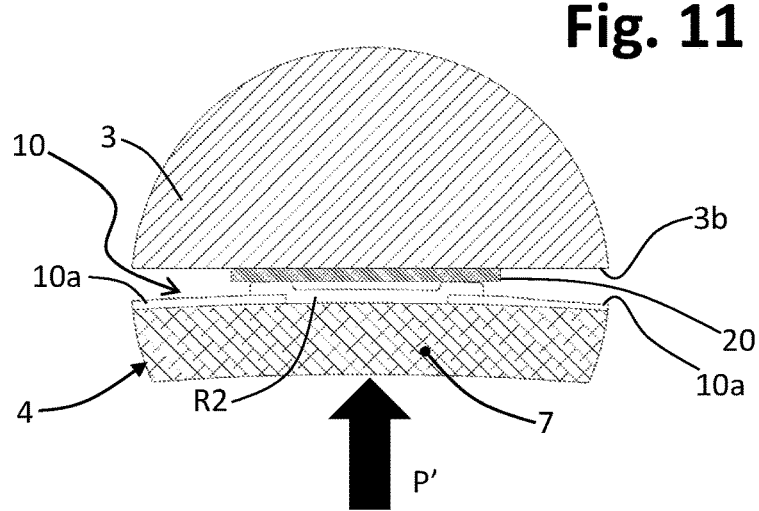
Figure 12:
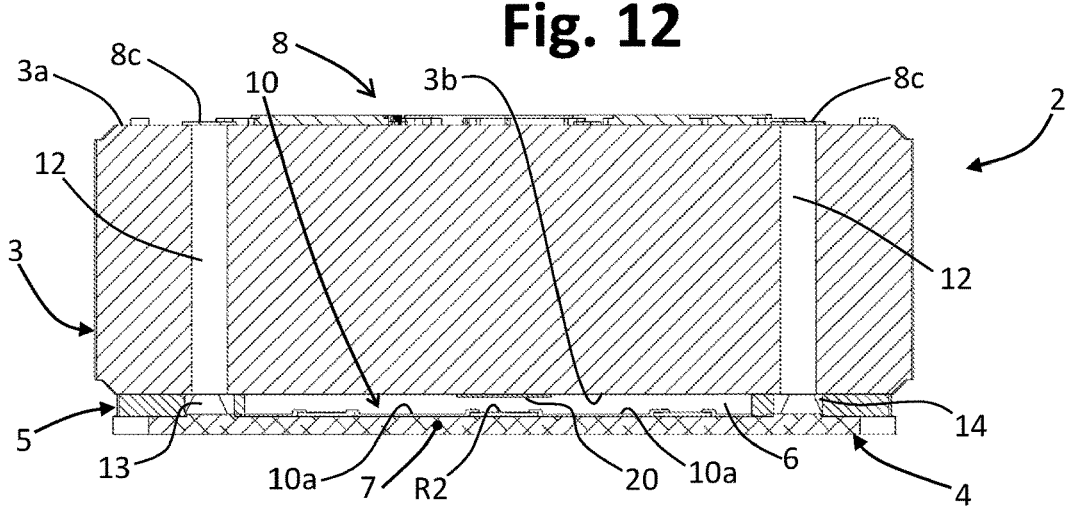
FIGS. 12, 13, and 14 are views similar to those of FIGS. 6, 8, and 10, respectively, regarding a sensor according to further possible embodiments.
Figure 13:
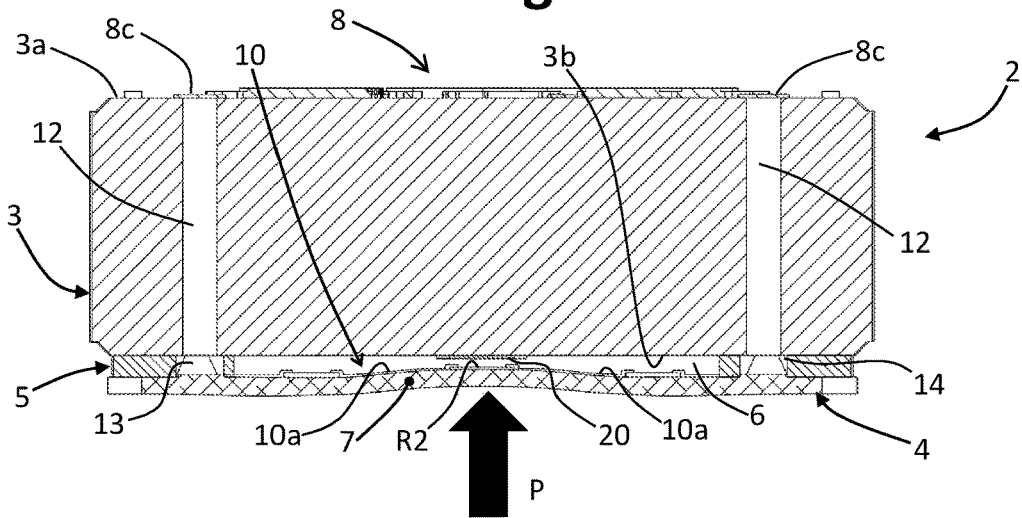
Figure 14:
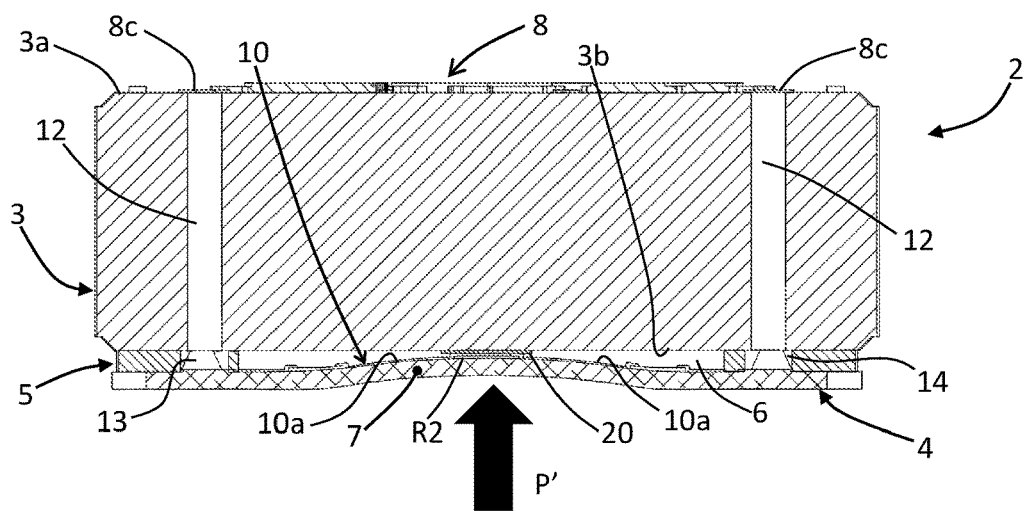

As may be noted also from the detail of FIG. 11, elastic flexure of the membrane portion 7 is such that a part of the circuit 10—here represented by the resistance R2—comes into contact with the circuit element 20.

As has been said, in this condition, the characteristic output signal of the detection circuit, here represented by the Wheatstone bridge R1, ..., R4, is electrically modified, the variation of the signal being such that it can be detected in an unequivocal and distinct way from the electrical signal that, instead, that is generated in conditions of pressure that fall within the nominal working range of the pressure sensor (i.e., when the pressure that impinges upon the membrane portion 7 is such as not to bring about contact between the element 20 and the circuit 10).

The solution proposed is based upon recognition of the fact that, in a traditional sensor, i.e., a sensor without the circuit element 20, the output signal of the detection circuit has a substantially defined characteristic plot in the nominal working range (for example, it varies in a linear way or according to a substantially predefined curve), and that—when as a result of an excessive pressure—the membrane portion comes into contact with the overlying body part of the sensor, this signal diverges from the characteristic plot, giving rise to possible detection errors.

In order to clarify this concept better, reference may be made to FIG. 51, which represents, in a simplified way, the behaviour of three traditional pressure sensors, which have a structure similar to the one so far described but without the circuit element 20. The graph of FIG. 51 represents the value expressed in volts of the output signals of the three sensors, designated by S1, S2 and S3, as a functions of the pressure expressed in bar. Assume, for simplicity, that the nominal working range of the three sensors is comprised between 8 and 11 bar (signal S1), 8 and 12 bar (signal S2), and 8 and 13 bar (signal S3), respectively.

As may be noted, the output signals S1, S2, and S3 are substantially monotonic and linear in the nominal working range of the three sensors. Instead, starting from pressures at least equal to 11.1 bar, 12.1 bar, and 13.1 bar, corresponding to the contact between the membrane portion of the sensor and the overlying part of the sensor body, the output signal starts to decrease. This variation of behaviour is basically due to the fact that, as the deformation of the membrane portion increases and its area of contact with the overlying body part increases, the central resistances of the measurement bridge are curved in the opposite direction (from a substantially concave configuration they tend to assume a substantially convex configuration), with the consequence that the value of the output signal, instead of increasing further, starts to decrease progressively. It will hence be appreciated that, to one and the same value of the output signal there may correspond two values of pressure that are clearly different from one another. See, for example, the value of the signals corresponding to an output voltage of 0.07 V, where:

in the case of the signal S1, to this value there may correspond a pressure of approximately 11 bar or else of approximately 15.8 bar, in the case of the signal S2, to this value there may correspond a pressure of approximately 9.8 bar or else of 12.8 bar; and in the case of the signal S3, to this value there may correspond a pressure of approximately 10.4 bar or else of 13.8 bar.

This type of behaviour may evidently give rise to considerable errors in the detection of pressure.

The solution according to the invention enables precise discrimination of when the pressure of the fluid to be detected exceeds the upper limit of the nominal working range of the sensor.

To return to the example so far illustrated (see, in particular, FIG. 11) the circuit element 20 may be made of a resistive material (or, alternatively, of a metal element or a highly conductive material) and be designed to come into direct contact with one of the resistances R1, ..., R4, here the resistance R2. As may be appreciated, following upon contact between the circuit element 20 and the resistance R2, the overall value of resistance of the bridge R1, ..., R4 is modified radically with respect to the normal working conditions (pressures in the nominal range), for example decreasing. The output voltage of the circuit 10 varies accordingly, so that it can be easily discriminated by the control electronics, for example the electronics implemented on the circuit 8 or else the electronics implemented in the external system to which the sensor 1 is connected.

Figure 7:
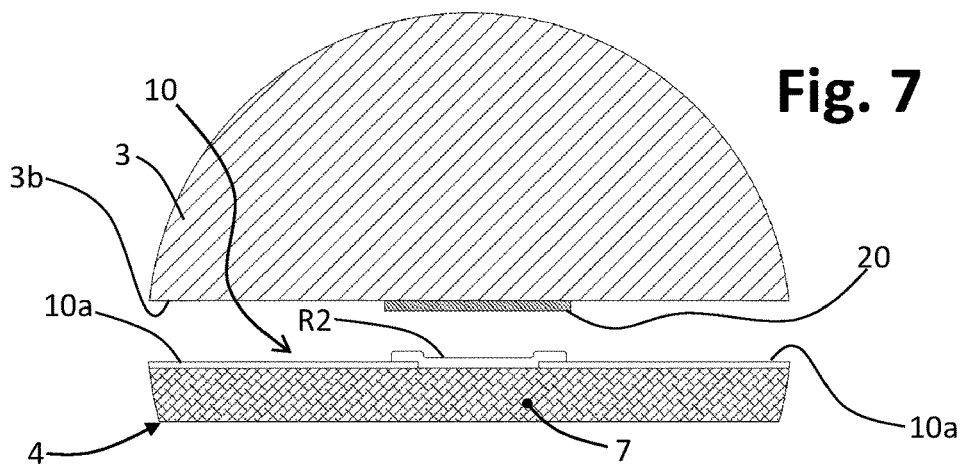
FIG. 7 is a detail at an enlarged scale of FIG. 6.

In the case exemplified in FIGS. 6-11, the resistances R1, ..., R4, or at least one of them, extend at least partially over the terminations of the corresponding connection tracks 10a, as may be clearly noted for example from the details of FIGS. 7, 9, and 11. In this way, the element 20 can come into direct contact with the resistance considered, following upon excessive deformation of the membrane portion 7.

Figure 15:
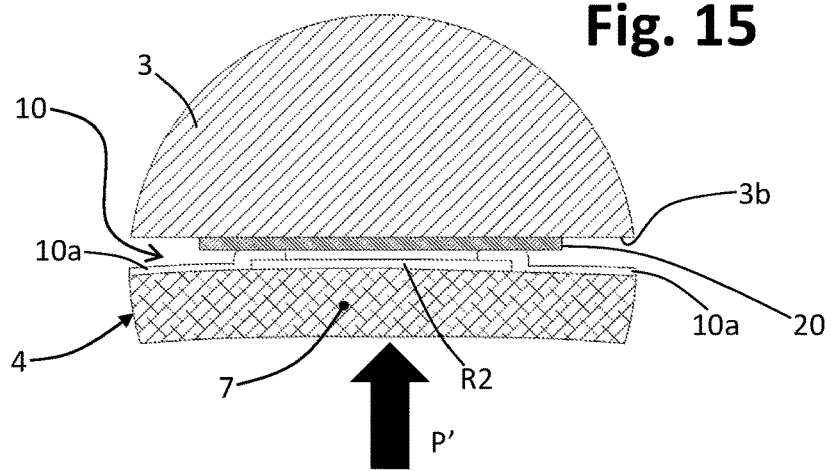
FIG. 15 is a detail at an enlarged scale of FIG. 14.

In other embodiments, however, a reverse arrangement is also possible, i.e., with the terminations of the conductive tracks 10a that extend at least partially over the resistances R1, ..., R4, or over at least one of them. Such a case is exemplified in FIGS. 12-15, from which it may be noted—in particular from the detail of FIG. 15—how in this case the circuit element 20 comes into contact with the terminations of the tracks designated by 10a, for connection of the resistance R2. In this case, for example, the circuit element 20 may be a metal element that is practically completely conductive, or with a very low electrical resistance, such as to short-circuit the two tracks 10a (also in this example, on the other hand, the circuit element 20 could be made of a resistive material). In this case, following upon contact due to an excessive deformation of the membrane portion, i.e., to an excessive pressure P' of the fluid, the overall value of resistance of the bridge R1, ..., R4 is modified radically with respect to the normal working conditions (pressures in the nominal range), for example decreasing, while the output voltage of the circuit 10 varies accordingly, in particular exceeding the maximum voltage value allowed when the sensor operates in the nominal pressure range envisaged for application of the sensor 1.

Figure 16:
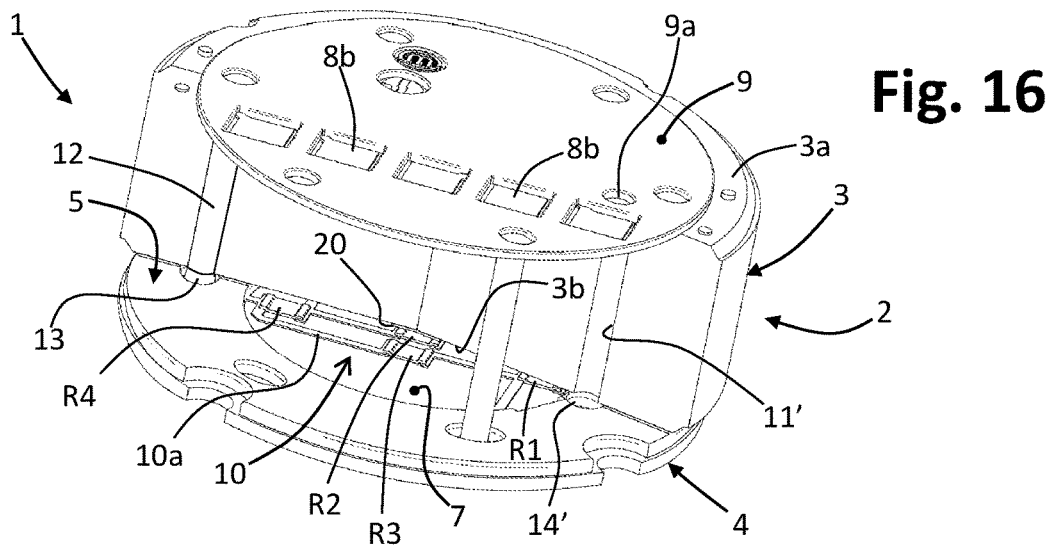
FIG. 16 is a schematic perspective and partially sectioned view of a sensor according to further possible embodiments.

Illustrated in FIG. 16 is another pressure sensor according to the invention, substantially of the second type previously referred to. In the example, the sensor 1 has an overall structure that is substantially similar to that of the sensor of FIG. 1, but in which the cavity or chamber delimited by the body parts 3, 4 and by the layer 5 of the fixing material is set in communication with the external environment. For this purpose, in the case exemplified in FIG. 16, the body part 3 has a passage 11', here made like the holes 11, designed to connect the cavity or chamber with the external environment (see also FIG. 50). For this purpose, preferentially also the layer of the fixing material 5 will be arranged, at least at the lower end of the hole 11', to enable communication thereof with the cavity or chamber defined between the parts 3, 4 and the layer 5. Of course, also the possible protective layer 9 set on the upper face 3a of the body part 3 will be formed so as to enable connection of the upper end of the hole 11' with the external environment: in the case exemplified, for this purpose, the layer 9 has a passage or opening 9a at the upper end of the hole 11'.

FIGS. 17-25 exemplify further possible implementations of the invention, in particular in relation to a pressure sensor of the aforementioned third type, designated as a whole by 1', having a body part that defines a respective cavity.

Figure 17:
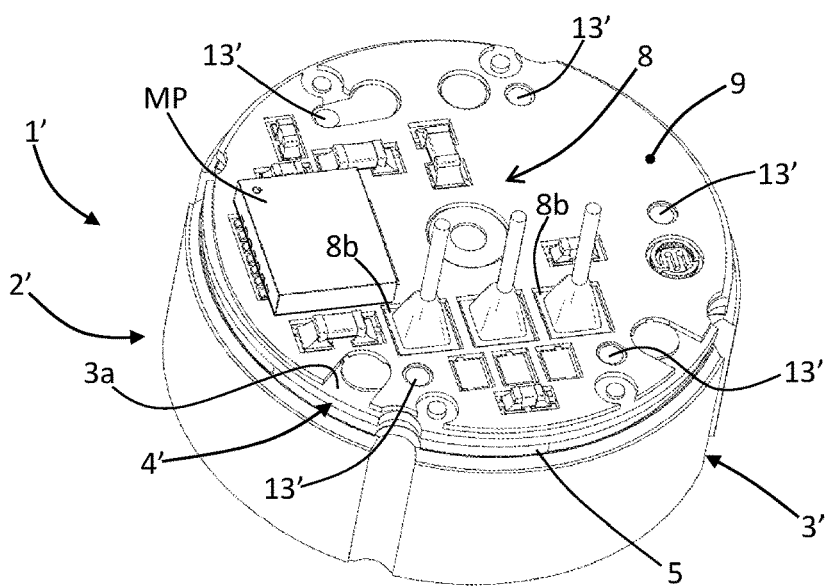
FIGS. 17 and 18 are a schematic perspective view and a schematic view from beneath, respectively, of a sensor according to further possible embodiments.
Figure 18:
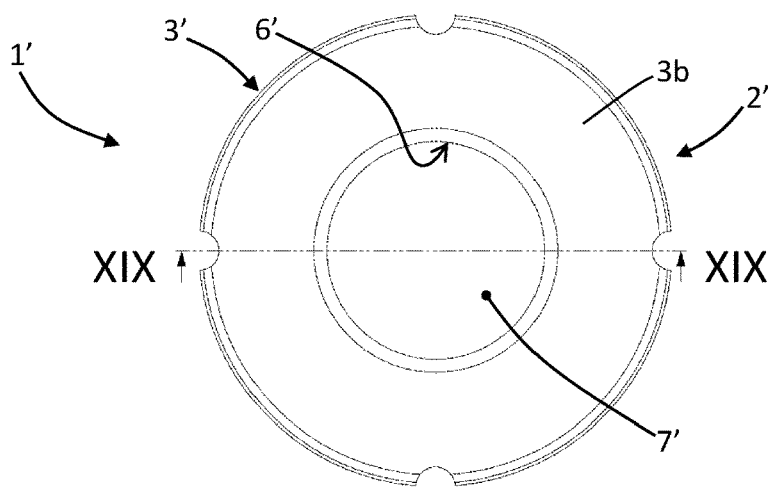

With reference, in particular, to FIGS. 17-19, in this case the thicker part 3' of the sensor body 2' defines a blind axial cavity, designated by 6' in FIGS. 18-19, which is closed at the upper end by a corresponding membrane portion 7', preferably defined integrally with the body part 3', for example made of ceramic material, such as alumina. As may be noted, in particular in FIG. 19, the cavity 6' is, instead, open at its lower end, i.e., at the lower face 3b of the part 3', so that it can receive within it the fluid to be detected.

Mounted at the upper face 3a of the body part 3' is the second body part 4', which is thinner than the body part 3' (excluding the membrane portion 7') and is preferably relatively stiff, for example in the form of a PCB or planar support. Implemented on the upper face of the body part 4' is the circuit 8, which—in the case of FIG. 17—is partially coated by a corresponding protective layer 9.

The body parts 3' and 4' are joined together in such a way that a first face of the body part 3'(here the upper face 3a), or in any case its membrane portion 7', faces the corresponding first face (here the lower face) of the body part 4', at a distance therefrom, as may be clearly noted in FIGS. 19 and 20. Also in this case the circuit 10 is set at least partially in an area corresponding to the membrane portion 7', for example with modalities similar to those already exemplified previously.

Also in this case, the means for joining the body parts 3' and 4' together may include a layer of fixing material 5' set between the parts in question, for example an adhesive or a sinterable material. It should be noted, however, that in this application it is not necessary for the layer 5' to seal together the two parts 3' and 4' in a fluid-tight way, the presence of a closed chamber between them not being essential.

FIG. 21 illustrates just the body part 3' with the corresponding circuit 10, which, as has been said, may be made like the one already described previously. In the case exemplified, the conductive tracks 10a of the circuit 10 come under respective electrical-connection formations 13', for example similar to those designated previously by 13, which can be deposited on the upper face 3a and rise therefrom in an axial direction. Such formations 13' may be advantageously used for connecting the circuit 10 to the circuit 8. For this purpose, for example, the body part 4' may be provided with through holes in positions corresponding to the formations 13' so that the latter penetrate at least partially into the aforesaid holes, as may be appreciated, for example, from FIG. 17. The aforementioned holes may be provided with a surface metallization, connected to corresponding conductive tracks of the circuit 8; alternatively, the aforementioned conductive tracks may be connected to the formations 13' by means of a weld material applied.

FIG. 22 is similar to FIG. 21, but illustrates further the circuit element 20, which, in various embodiments, is configured for coming into contact with two detection components of the circuit, here represented by the central resistances R2 and R3. As may be noted from FIGS. 19 and 20, in this case the element 20 is set on the lower face of the body part 4', also in this case preferentially in a position corresponding to a central region of the membrane portion 7'.

As may be appreciated from FIGS. 23-24, the principle of operation of the sensor 1' is similar to what has already been described above. Also in this case, in fact, an excess of pressure P' with respect to the nominal working range of the sensor 1' causes an excessive deformation of the membrane portion 7', such as to bring about contact between at least one part of the circuit—here represented by the resistances R2-R3—with the conductive circuit element 20 carried by the body part 4', as highlighted in FIG. 24. This contact, irrespective of the type of electrically conductive material that forms the element 20 (a resistive material or else a highly conductive material), causes a sharp variation in the output signal of the measurement bridge R1, ..., R4, which can clearly be discriminated by the control electronics, i.e., is indicative of the excess of pressure with respect to the nominal range.

In the case of FIGS. 17-24, the resistances R1, ..., R4 extend at least partially over the corresponding terminations of the connection tracks 10a, but of course an opposite configuration is also possible, of the type already described above, as highlighted in FIG. 25, where the terminations of the connection tracks 10a extend at least in part over the resistances R1, ..., R4.

Figure 26:
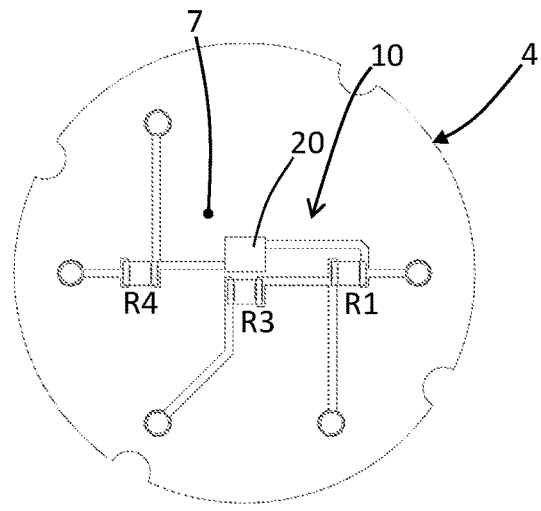
FIGS. 26 and 27 are a schematic top plan view and a schematic perspective view, respectively, of a sensor according to possible embodiments, with some parts removed.
Figure 27:
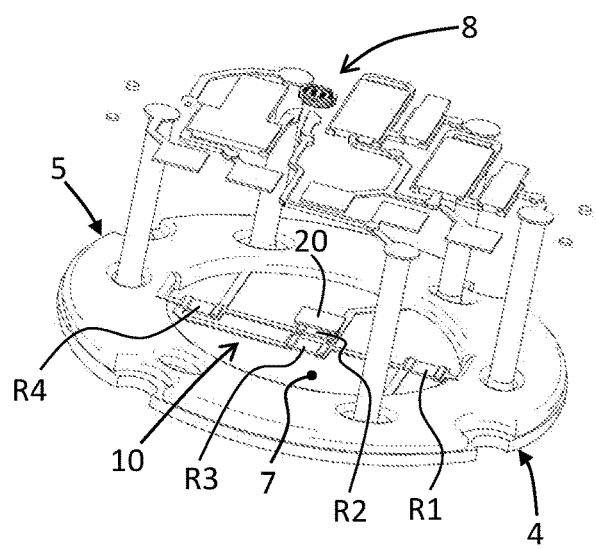
Figure 28:
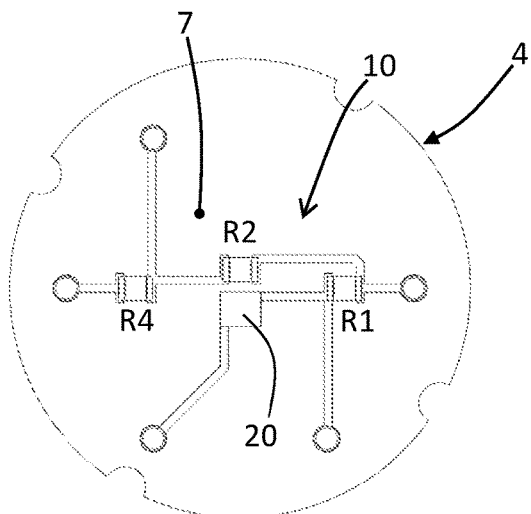
FIGS. 28-29, 30-31, 32-33, 34-35, and 36-37 are views similar to those of FIGS. 26-27, regarding further possible embodiments.
Figure 29:
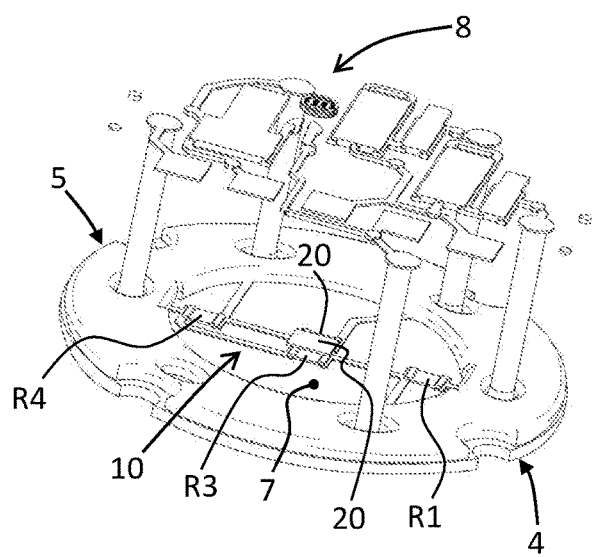

FIGS. 26-27, 28-29, 30-31, and 32-33 illustrate merely by way of example some of the possible alternative configurations of circuit elements 20. FIGS. 26-27 illustrate the case, already described, of an element 20 designed to come into contact with the resistance R2, substantially short-circuiting it or else connecting a resistance obtained with the element 20 in parallel to the resistance R2 (hence reducing the value of the resistance R2), whereas FIGS. 28-29 illustrate the similar case in relation to the resistance R3.

Figure 30:
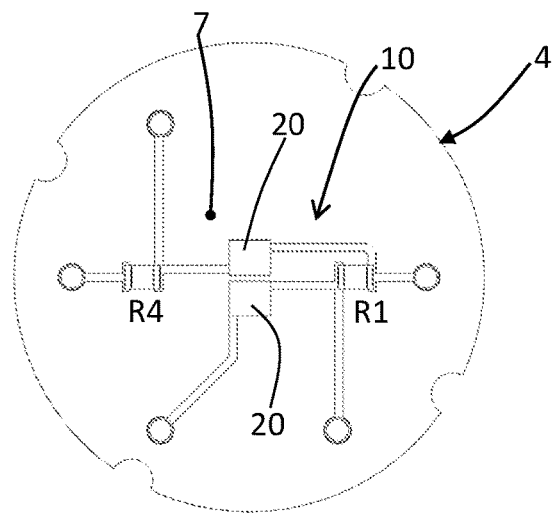
Figure 31:
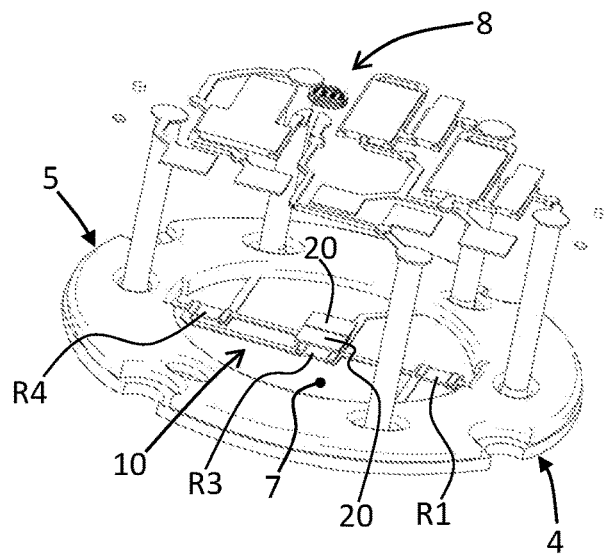

FIGS. 30-31 illustrate the case of two distinct circuit elements 20, designed to come into contact with the two resistances R2 and R3, separately from one another, in order to short-circuit them or reduce the resistance value thereof.

Figure 32:
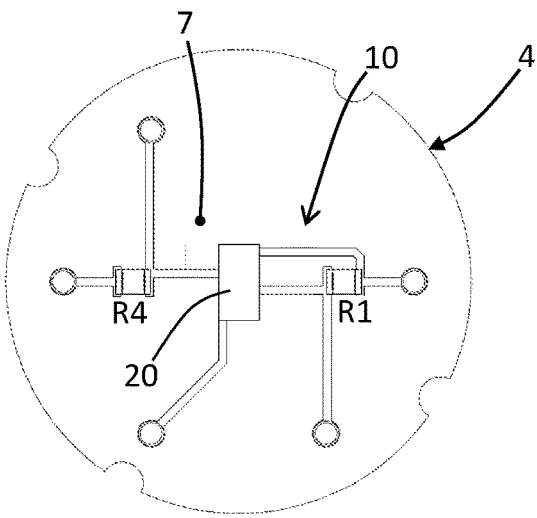
Figure 33:
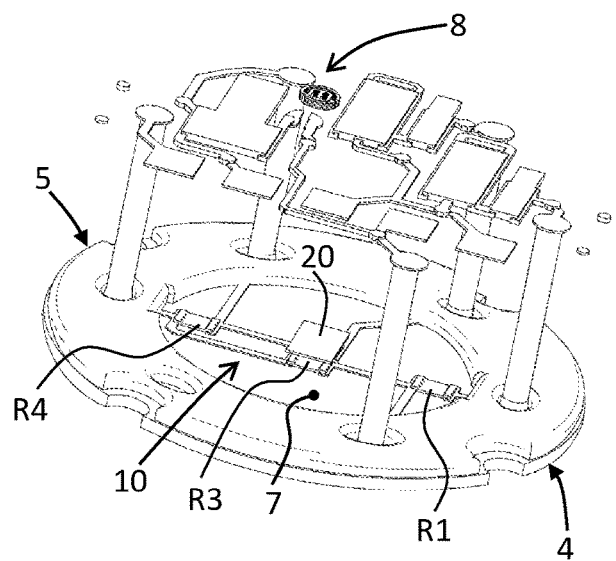

FIGS. 32-33 highlight, instead, the case, already referred to, of a single element 20 that comes into contact simultaneously with the resistances R2 and R3, in particular to bring about a reduction of resistance or a short circuit both of the value of the individual resistances and between the resistances R2 and R3, i.e., a short circuit between parts of the corresponding measurement bridge, with greater variation of the signal.

Figure 34:
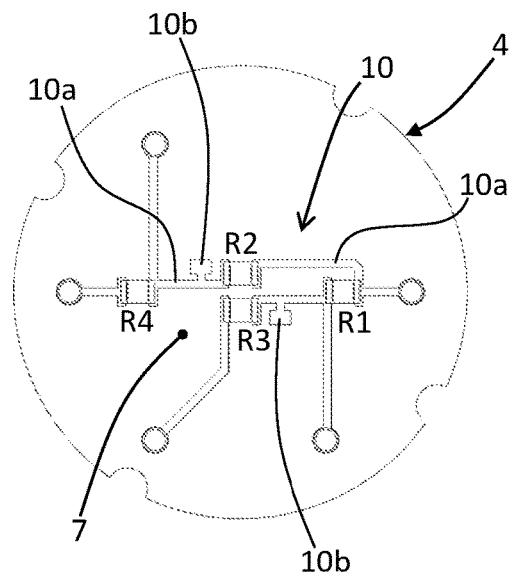
Figure 35:
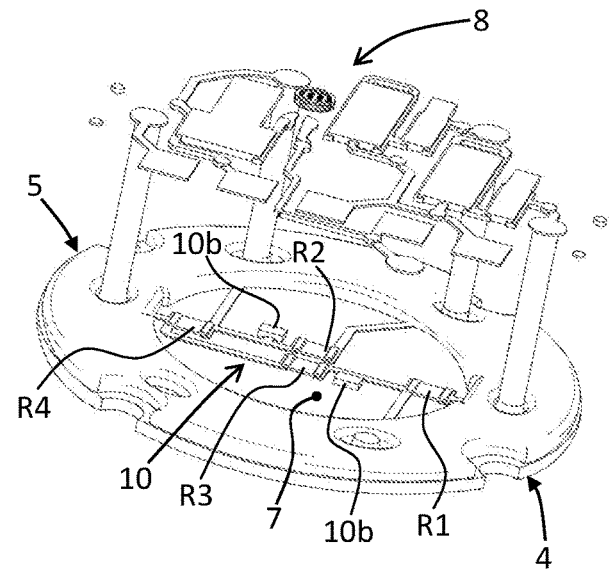
Figure 36:
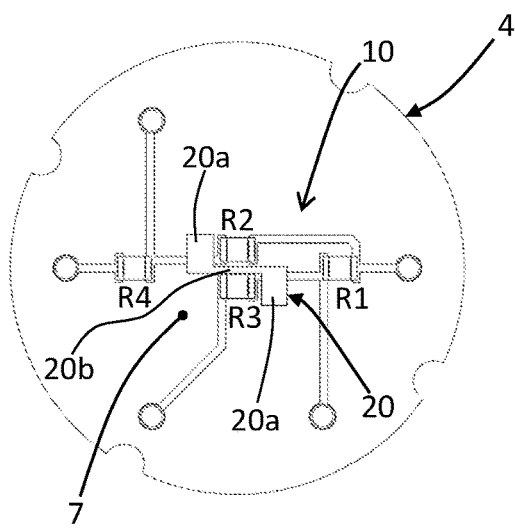
Figure 37:
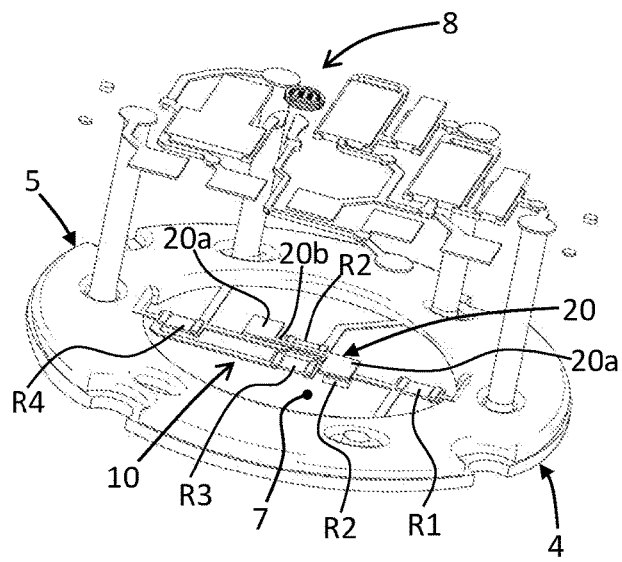
Figure 38:
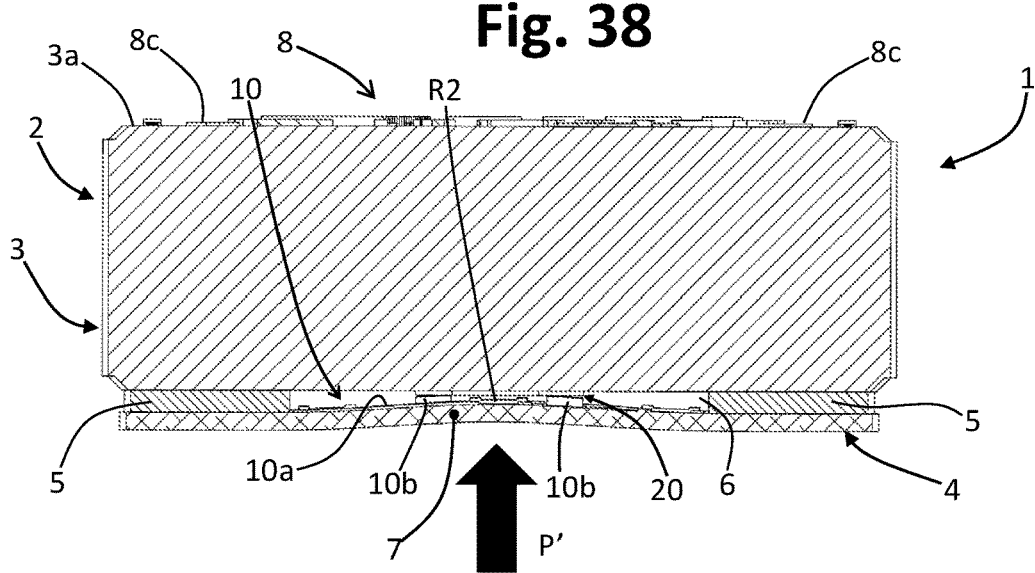
FIG. 38 is a schematic cross-sectional view of a sensor according to the embodiment of FIGS. 36-37.
Figure 39:
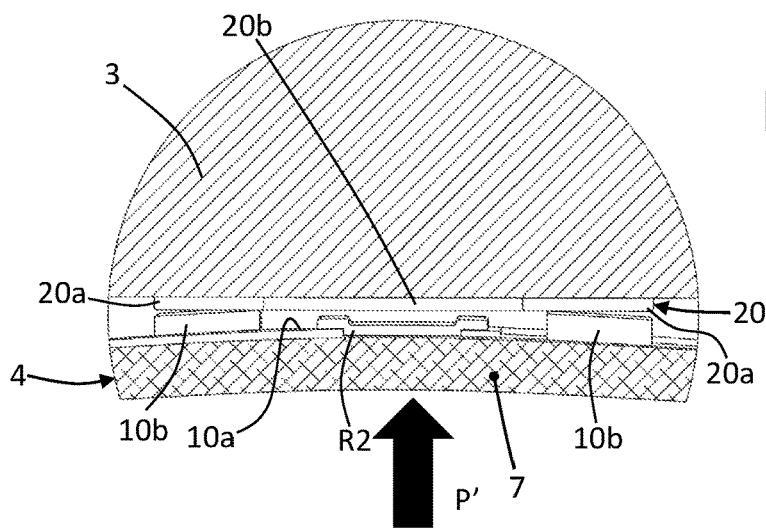
FIG. 39 is a detail at a larger scale of FIG. 38.

In various embodiment, the circuit element 20 and the circuit 10 may be prearranged so as to come into mutual contact in positions different from at least one detection component of the circuit 10. For instance, with reference to FIGS. 34-35, two different conductive tracks 10a of the circuit 10 (here two conductive tracks that come under the resistances R2 and R3, respectively) are formed so as to present two corresponding pads 10b. On the other hand, FIGS. 36-37 illustrate a possible conformation of a circuit element 20 that is configured for coming into contact with the aforementioned two pads 10b and short-circuiting them—or connecting them together with a resistance obtained by the element 20 itself—without, however, coming into contact with the resistances R2 and R3. In the example, this contact element includes two end portions 20a, in positions corresponding to the pads 10b, connected together by means of an intermediate portion 20b set in a position corresponding to the space that separates the resistances R2 and R3 from one another. In this way, as exemplified in the subsequent FIGS. 38-39, in the presence of an excessive pressure P' of the fluid, i.e., one that exceeds the nominal working range of the sensor 1, the pads 10b come into contact with the portions 20a of the element 20, whereas its intermediate portion 20b does not touch the resistances R2 and R3. For this purpose, it is preferable for the top of the pads 10b to be located at a greater height than the resistances R2 and R3. Also in this case, the element 20 may comprise resistive material to define a resistance, or else may comprise metal material or highly conductive material to define a short-circuit element or bridge. Also in such an embodiment the final effect is the one already described above, consisting in a variation that can be discriminated of the output signal of the circuit 10.

Figure 40:
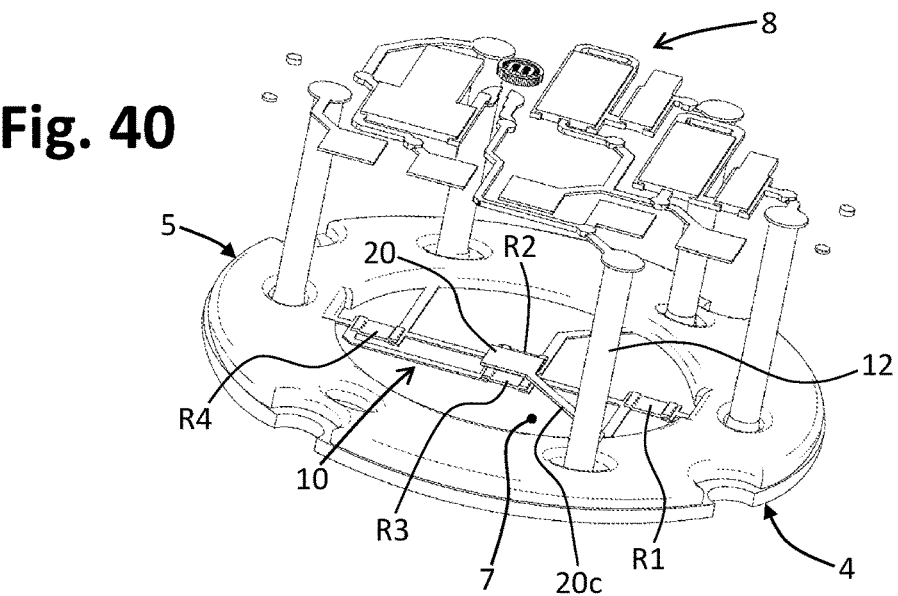
FIG. 40 is a schematic perspective view of a sensor according to possible embodiments, with some parts removed.

The circuit element 20 may also be electrically connected to one or more branches of the measurement bridge R1, . . . , R4. Such a case is exemplified in FIG. 40, where coming under the element 20 is a respective electrically conductive track 20c, which is also set on the face of the part of the sensor body (here not illustrated) that faces the membrane portion 7, at a distance therefrom. The other end of the track 20c is connected to one of the branches of the bridge R1, . . . , R4, for example via one of the metallizations 12 used for connecting the circuit 10 to the circuit 8. It will be appreciated that, also in such an embodiment, the final effect of the contact between the element 20 and the circuit 10, for example in a position corresponding to the resistance R2, will give rise to a sharp variation of the output signal of the bridge R1, . . . , R4, which can be recognized by the control electronics as being representative of an excessive pressure of the fluid.

Albeit preferable, the circuit element 20 does not necessarily have to be in a position substantially corresponding to one or more central detection components of the circuit 10, such as the resistances R2 and R3. The element 20 could in fact be set so as to interact with one or both of the other resistances R1 and R4.

Figure 41:
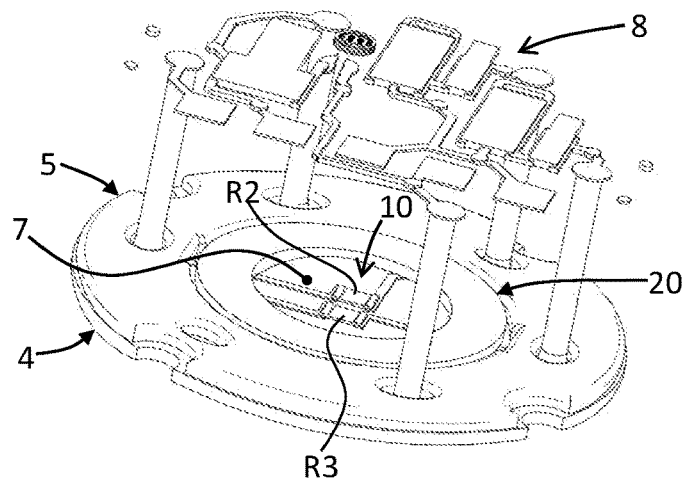
FIG. 41 is a schematic perspective view of a sensor according to further possible embodiments, with some parts removed.

Such a case is exemplified in FIG. 41, where the circuit element 20 has a substantially annular shape, and is arranged so that it can be contacted by the resistances R1 and R4 (i.e., by terminations of the corresponding conductive tracks 10a), following upon an excessive pressure of the fluid, as already explained above. The circuit element 20 could, however, provide a contact with even just one of the resistances R1, R4, or else have some other shape in any case designed to provide a contact with both of the resistances R1 and R4 (for example, a semicircular shape or a shape including two pads connected together by at least one conductive track).

Preferably, in this case, the thickness of the element 20 is comparatively larger than in the cases exemplified above. On the other hand, the element 20 could be set on a portion in relief of the corresponding face of the body part 3, i.e., in a plane thereof that is closer to the membrane 7.

Figure 42:
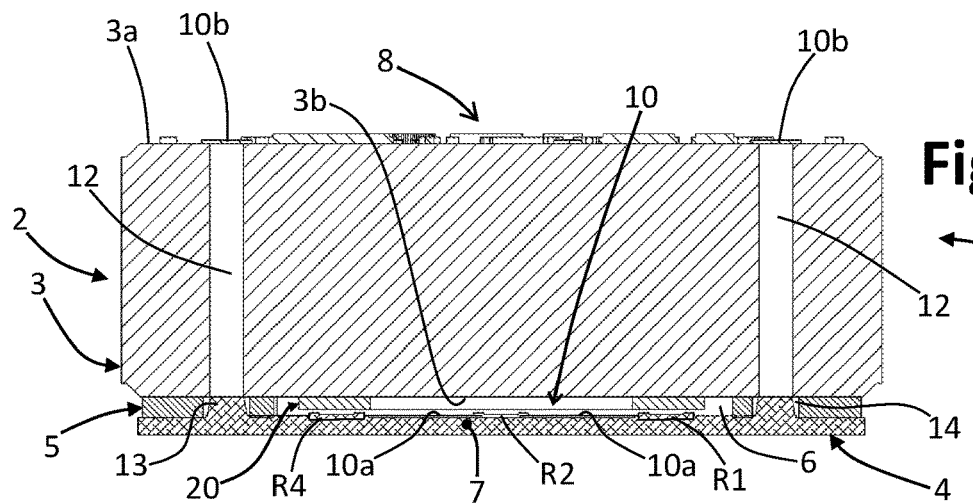
FIGS. 42 and 43 are schematic cross-sectional views of a sensor according to the embodiment of FIG. 41, in two different conditions.

As may be noted from FIG. 42, in the absence of pressure of the fluid, the membrane portion 7 is substantially plane or at rest, and hence with all the resistances R1, . . . , R4 (or the corresponding terminations of the corresponding connection tracks 10a) at a distance from the element 20. Setting-up of a pressure of the fluid that is in the nominal working range of the sensor 1 brings about, as described previously, a deformation of the membrane portion 7 of a degree such as not to cause contact between the resistances R1 and R4 and the element 20.

Figure 43:
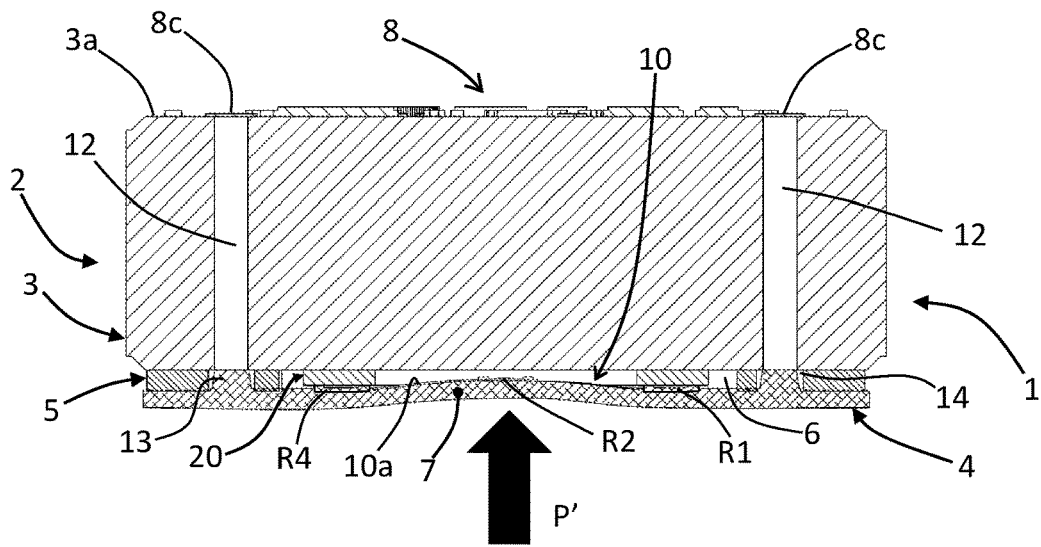
Figure 44:
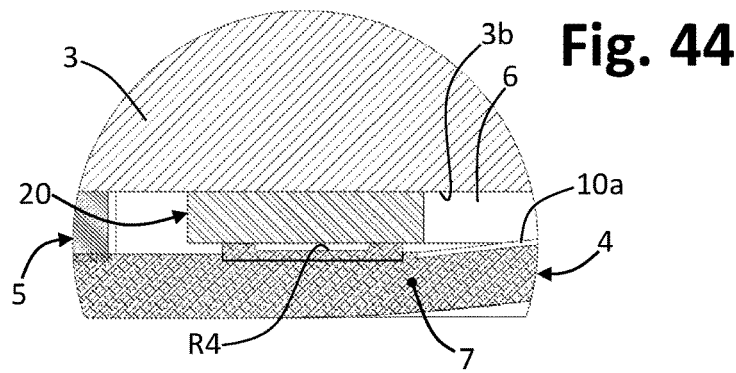
FIG. 44 is a detail at an enlarged scale of FIG. 43.

When, instead, the pressure P' applied to the membrane portion 7 exceeds the nominal pressure of the sensor, there occurs in any case an excess of deformation of the aforesaid portion 7 towards the overlying body part 3. The central region of the membrane portion 7 is free to undergo deformation towards the body part 3, thanks to the presence of the central passage of the element 20. The membrane portion 7 undergoes deformation also in its peripheral region, corresponding to the resistances R1 and R4, so that the latter rise. In this way, contact is brought about between the resistances R1 and R4 and the ring-like element 20, as illustrated schematically in FIG. 43, and highlighted in FIG. 44 with reference to the resistance R4. Also in this case, there is hence caused a sharp variation of the output signal of the circuit 10 that can be discriminated and can be detected by the control electronics.

It should be noted that, in other variant embodiments not represented, the circuit element 20 could be shaped and arranged so as to be able to contact or interact with all the resistances R1, R2, R3, R4, or else with a different combination of at least some of the resistances (for example, R1 and R2, or R1 and R3, or else R2 and R4, or else R3 and R4).

As may be seen, then, the element 20 may be an electrically resistive element, configured for providing an electrical resistance that is to come into contact, and hence be electrically connected, to at least part of the circuit 10, for example providing a connection in parallel to at least one electrical resistance R1, . . . , R4 of the detection circuit, or providing a connection between a plurality of electrical resistances R1, . . . , R4 of the detection circuit, or a connection between connection tracks 10a of a detection component R1, . . . , R4 belonging to the detection circuit. Alternatively, as has been said, the element 20 may, however, also be a metal element or a highly conductive element, which provides a short-circuiting element, designed to be set in contact, and hence be electrically connected, to at least part of the circuit 10, such as a short-circuit connection across at least one electrical resistance R1, . . . , R4 of the detection circuit, or a short-circuit connection between a plurality of electrical resistances R1, . . . , R4 of the detection circuit, or a short-circuit connection between connection tracks 10a of a detection component R1, . . . , R4 belonging to the detection circuit.

From the foregoing description the characteristics of the present invention emerge clearly, as likewise its advantages.

The sensor according to the invention is provided with means designed to detect, and/or signal (warn) of, a contact of its membrane portion with or excessive approach thereof to another part of the sensor body. This detection or signalling (warning) may be obtained through a predefined variation of the output signal of the measurement circuit that is responsible for detecting deformation of the membrane portion, for the purposes of pressure detection. On the other hand, as has been seen, according to the invention it is also possible to envisage, in addition to the aforesaid measurement circuit, a second electrical or electronic circuit, designed to detect contact of the membrane portion with or excessive approach thereof to another fixed part of the sensor body, even in the absence of direct contact. The solution proposed makes it possible, in a simple, inexpensive, and reliable way, to prevent any risks of faulty detections, when the deformation of the membrane portion of the sensor exceeds what is allowed in the nominal working range of the sensor.

It is clear that numerous variations may be made by the person skilled in the branch to the pressure sensor described by way of example, without thereby departing from the scope of the invention, as defined in the annexed claims.

The circuit 10 may be configured for making available a safety or fault signal, i.e., a signal indicative of the excess of pressure, which is additional and independent of the output signal of the measurement bridge R1, . . . , R4.

For instance, the circuit 10 may present specific pads that are to be short-circuited or in any case connected together by the element 20, also in the form of a resistive element, in order to give rise to the aforesaid safety signal. More in general, then, the circuit element 20 may be an electrically conductive element that provides, together with dedicated pads and conductive tracks present on the membrane portion, a switch or an electrical contact, suitable to supply a fault signal.

Figure 45:
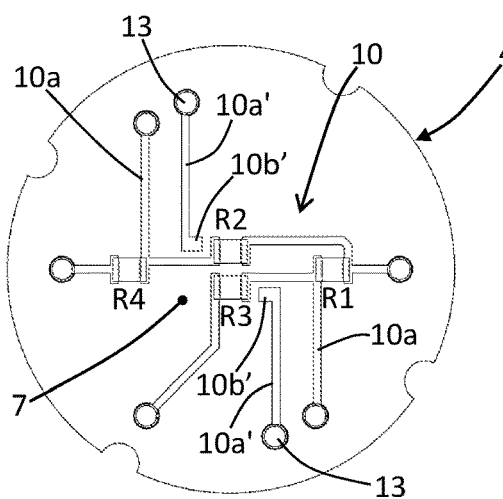
FIGS. 45 and 46 are schematic top plan views of a sensor according to further possible embodiments, with some parts removed.
Figure 46:
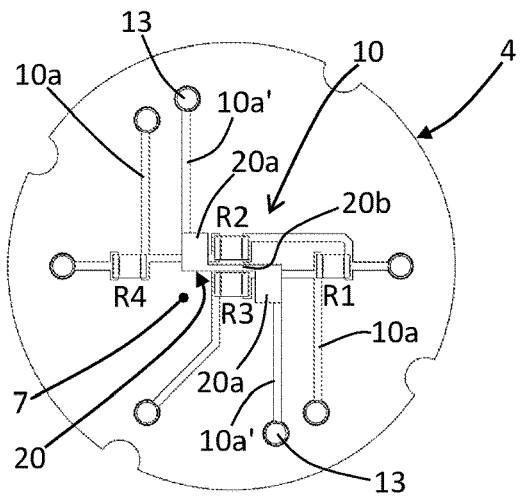

Such a case is exemplified in FIGS. 45-46, where the circuit 10 includes two additional conductive tracks 10a', which come under respective formations 13 (and hence under respective tracks such as those made of the material 12 in FIG. 4) and define respective pads 10b', which are electrically insulated or independent of the tracks 10a of the detection circuit R1, . . . , R4. The contact element 20 can in this case be of a conception similar to what is described with reference to FIGS. 36-39, i.e., shaped so as to be contacted by the pads 10b' and not by the resistances R2 and/or R3. The element 20 can hence include two end portions 20a and an intermediate portion 20b, as already described above.

In this case, in the presence of an excessive pressure, the output signal of the measurement circuit will not be altered by the circuit element 20. However, the latter, connecting together the two pads 10b', will give rise to an additional signal, representative of the excessive deformation of the membrane portion 7, the signal being, instead, absent when the sensor operates in its nominal working range. Also in the case where the output signal of the measurement circuit R1, . . . , R4 is affected by the problem explained in relation to FIG. 51, the simultaneous presence of the aforesaid additional signal determined by contact of the element 20 with the pads 10b' will be interpreted by the control electronics of the sensor as being indicative of the existence of an excessive pressure of the fluid. Hence, in embodiments of this type, the pads 10b' and the circuit element 20 form a sort of switch, which closes a signalling (warning) circuit when a pressure of the fluid that exceeds the nominal pressure of the pressure sensor is reached. This sort of switch may comprise a contact element 20 designed to provide a short-circuit bridge between the pads 10b', or else may provide an electrical resistance between the pads 10b', in any case being able to supply a signal that can be detected by a suitable control circuit.

In the example of FIGS. 45-46, the output signal of the detection circuit, which is representative of a value of measurement of the pressure, is distinct from the aforesaid additional safety signal, which is representative of a state of anomaly. However, the sensor according to the invention may be provided with a suitable circuit for control, processing, and transmission of the data (for example, in the form of a chip belonging to the circuit arrangement), configured for combining and/or transmitting the set of information regarding the value of measurement and the state of anomaly, preferably via a single electrical connection, for example of a serial type.

The circuit element 20 provided according to the invention may also include a metal or electrically conductive element that provides, together with at least one further component provided on the membrane portion (preferably, a component not belonging to the deformation-detection circuit), a proximity or position detector, configured for supplying a fault signal, even in the absence of contact between the element 20 and the aforesaid further component.

Figure 47:
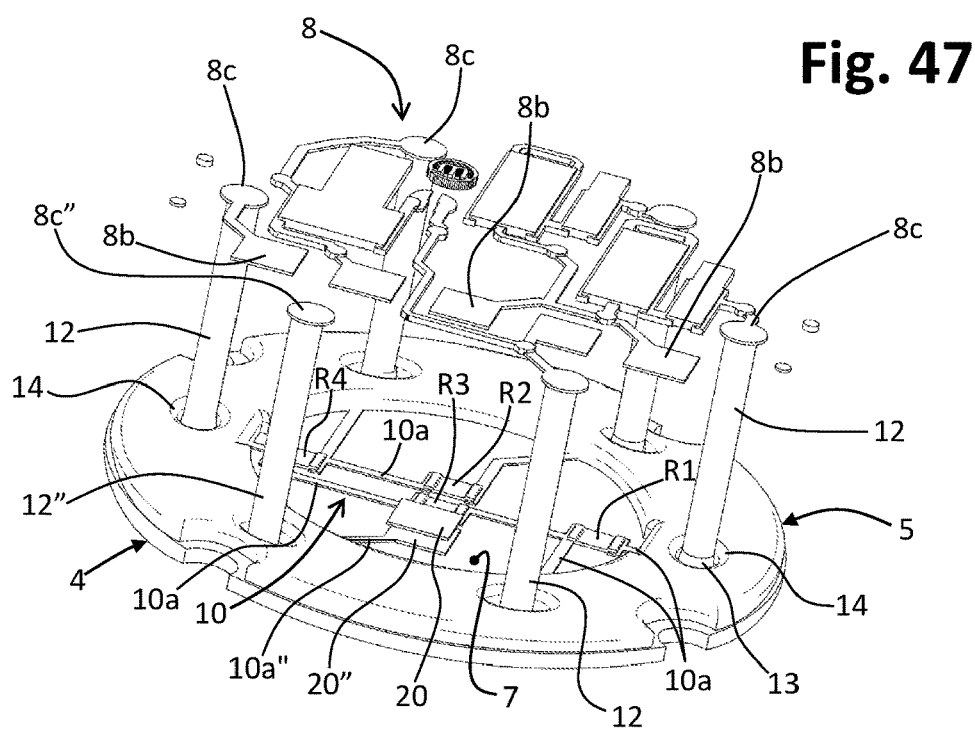
FIGS. 47 and 48 are views similar to those of FIGS. 4 and 21, respectively, regarding possible variant embodiments.

FIG. 47 represents an example in this sense, for a sensor 1 having a basic structure of the type illustrated in FIGS. 1-4, where corresponding to the circuit element 20, on the membrane portion 7, is a similar element 20" that is connected via a respective track 10a" and a respective axial track 12" to the circuit 8.

In the example, it may be assumed that the elements 20 and 20" function as facing plates of a capacitor, for example made of metal material, one (20) of which in a fixed position and the other (20") in a variable position, connected to the control electronics. In this application, when the deformation of the membrane portion 7 is excessive—i.e., it exceeds the safety limit—the two plates 20, 20" determine between them a capacitance that can be detected by the circuit arrangement of the sensor 1 (or by the external system to which the sensor 1 is connected), which is indicative of excess pressure. A similar case is exemplified in FIG. 48, in relation to a sensor 1' having a basic structure of the type illustrated in FIGS. 17-19, where the element or plate 20" is connected to a conductive track 10a" coming under a corresponding formation 13".

Figure 48:
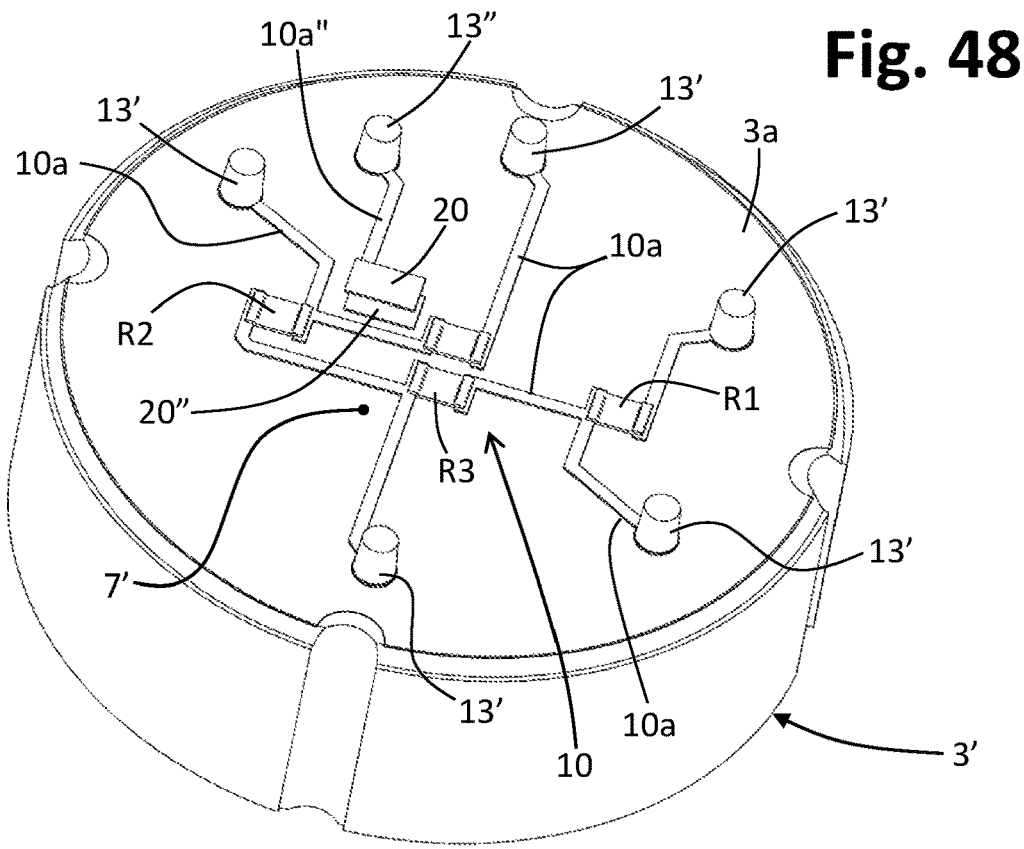

In the examples of FIGS. 47 and 48 the elements 20 and 20" substantially provide a proximity sensor of a capacitive type, where the element or plate 20, preferably in the form of a metal pad, albeit without an electrical connection, is such as to interact with the element or plate 20", causing a variation of capacitance thereof; however, if need be, also the element or plate 20 could be provided with respective electrical tracks for a connection to the circuit 8 or other part of the circuit arrangement of the sensor 1.

Similar structures are valid for the purposes of production of a sensor of an inductive type or, possibly, of a magnetic type. For instance, the element 20" could include a coil or winding made of electrically conductive material, and appropriate electrical connections to the circuit 8, which can be activated by an element 20, preferably of a ferromagnetic type, to generate a distinct fault signal. In such a case, the coil or winding could also be on the fixed body part, and the element 20 on the membrane portion. Alternatively, the element 20 could include a permanent magnet and the element 20" include a magnetic sensor, such as a sensor of the Hall-effect type. Also in this case, the magnetic sensor 20" could be on the fixed body part, and the magnetic element 20 on the membrane portion.

Figure 49:
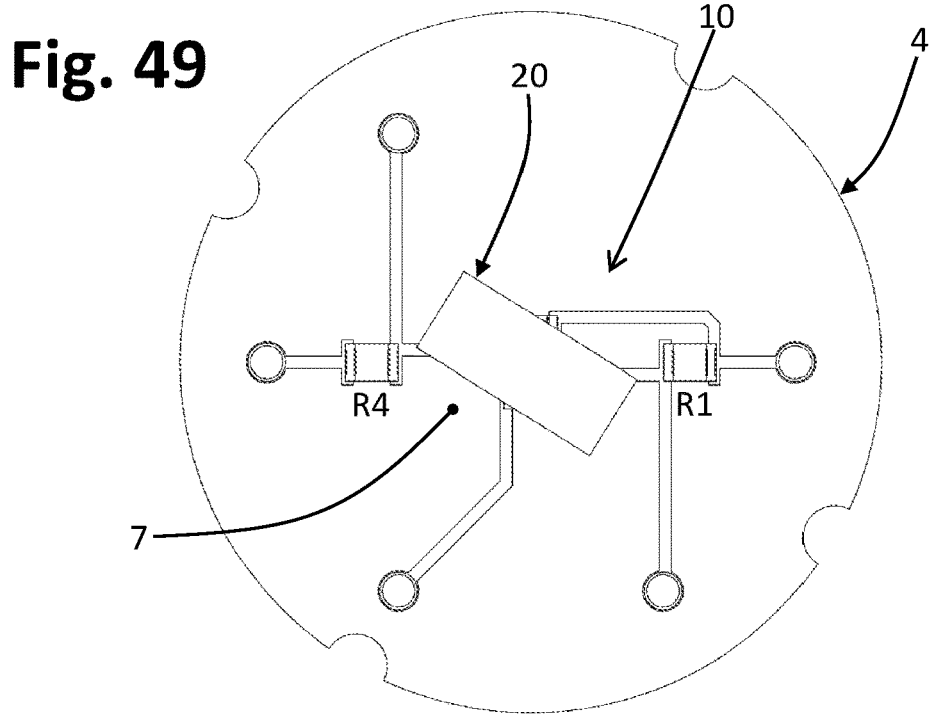
FIG. 49 is a schematic top plan view of a part of a sensor according to further possible embodiments.

FIGS. 49 and 50 refer to an embodiment conceptually similar to that of FIGS. 34-37 (or possibly of FIGS. 45-46), where, however, the circuit element 20 present in front of the membrane portion 7 has a simplified shape. In the example, the element 20 has the shape of a simple plate or pad having a quadrangular, preferably rectangular, profile with an inclination with respect to the circuit 10 such that it can be contacted by the pads 10b, preferably (but not necessarily) without coming into contact with the resistances R2 and R3. In the case where the aim is to prevent contact with the resistances, as in the case of FIGS. 34-37 (or of FIGS. 45-46), it is preferable for the top of the pads 10b to be located at a height greater than the resistances R2 and R3, as may be seen in FIG. 50.

The various electrically conductive tracks and/or the resistances and/or the circuit elements described previously may be obtained on the corresponding parts of the sensor body 2 with a technique different from screen printing, even though this is the preferred technique; for example, alternative techniques in this sense may be selected from among lithography, photo-lithography, spraying of conductive material, surface metallization, plating, etc.

As already mentioned, the presence of active or passive circuit components in the circuit 8 is not strictly necessary, in so far as treatment and/or processing of the signal or signals generated by means of the circuit 10 could be performed in the external system to which the pressure sensor is connected: hence, in such embodiments, the circuit 8 could perform simple interface or connection functions, presenting only the pads 8b and the corresponding connection tracks 8b.

The pressure sensor according to the invention could in any case comprise active or passive circuit components in the circuit 8, for example as exemplified in FIG. 17. In the example, the circuit 8 of the sensor 1' comprises a control and/or processing and/or transmission circuit MP, for example in the form of a chip or die, which may comprise a digital processor (such as a microprocessor or microcontroller circuit or an integrated ASIC or FPGA circuit), which may be provided with or have combined electronic memory means, preferably of a nonvolatile and/or electronically re-writeable type. Such a circuit MP is moreover provided with inputs and outputs and, preferably, analog-to-digital conversion means. The circuit MP may, if need be, also envisage a data-transmission circuit in serial format, very preferably by way of an a SENT (Single-Edge Nibble Transmission) or CAN (Controller Area Network) interface and/or protocol, or else in Ethernet format.

A control circuit, for example of the type designated by MP in FIG. 17, could be configured for supplying a digital signal of a serial type, suitable for representing multiple information on one and the same serial output, such as the pressure-measurement value and the possible state of anomaly. Such a control circuit could also be configured for discriminating in a single input signal the information representing the pressure-measurement value from the information representing the possible state of anomaly, and then transmitting them separately, or in a serial way.

The circuit element provided according to the invention, which is to interact with the circuit present on the membrane portion of the sensor, could be obtained directly from the corresponding part of sensor body (the parts 3 or 4', in the case of sensor structures of the type described with reference to FIGS. 1-4 or to FIGS. 17-19, respectively) when this body part is made of metal or electrically conductive material, at least in its portion facing the membrane portion of the sensor.

The invention claimed is:

1. A pressure sensor for detecting the pressure of a fluid, having a sensor body that comprises at least one first body part and one second body part each having a first face and a second face opposite to one another,
    wherein the first body part and the second body part are joined together in such a way that the first face of the first body part faces the first face of the second body part, at a distance therefrom;
    wherein at least one of the first body part and the second body part includes a membrane portion, subject to elastic flexure or deformation towards the other one of the first body part and the second body part as a result of pressure of the fluid, the membrane portion defining at least part of the first face of the first body part or of the second body part;
    wherein the pressure sensor has a circuit arrangement supported by the sensor body, which comprises at least one first electrical circuit that extends at least in part at the membrane portion and is configured at least for detecting one said elastic flexure or deformation through at least one respective detection component in order to provide first information representative of a measurement of pressure;
    wherein the first electrical circuit is associated to the first face of one of the first body part and the second body part, and the first face of the other one of the first body part and the second body part forms or has associated thereto at least one circuit element, prearranged for interacting with the first electrical circuit when one said elastic flexure or deformation of the membrane portion is of a degree at least equal to a substantially predetermined limit, to generate thereby second information or signaling, the second information or signaling being representative of at least one from among an excessive pressure of the fluid, an incorrect pressure measurement, and an anomalous state of the pressure sensor.

2. The pressure sensor according to claim 1, wherein the at least one circuit element is an element that is functionally distinct from the first electrical circuit.

3. The pressure sensor according to claim 1, wherein the at least one circuit element comprises an element made of electrically conductive material, such as a resistive material or a metal material or a material with high electrical conductivity, with which at least one part of the first electrical circuit comes into contact following upon one said elastic flexure or deformation of the membrane portion of a degree at least equal to said substantially predetermined limit.

4. The pressure sensor according to claim 3, wherein said part of the first electrical circuit comprises at least one of the following:
    one said detection component;
    an electrically conductive track for connection of one said detection component;
    a contact pad electrically connected to an electrically conductive track of the first electrical circuit.

5. The pressure sensor according to claim 3, wherein:
    the pressure sensor is prearranged for detecting pressures of the fluid comprised in a nominal working range, between a minimum pressure and a maximum pressure;
    the first electrical circuit is configured for supplying an output signal that represents a pressure value of the fluid, the output signal being an electrical quantity that can assume a value comprised in a range of nominal values, between a minimum value and a maximum value that correspond to said minimum pressure and said maximum pressure, respectively; and contact between the at least one circuit element and the at least one part of the first electrical circuit causes a variation of the output signal such that the value of the corresponding electrical quantity is not comprised in said range of nominal values.

6. The pressure sensor according to claim 1, wherein:
the at least one circuit element belongs to a signaling circuit;
interaction between the at least one circuit element and the at least one part of the first electrical circuit causes a corresponding signal representative of said second information or signaling, which is independent of an output signal of the first electrical circuit representative of said first information.

7. The pressure sensor according to claim 1, wherein the at least one circuit element comprises a first electrically conductive element that provides, together with at least one second electrically conductive element associated to the first face to which also the first electrical circuit is associated, a proximity or position detector, the proximity or position detector being configured for generating said second information signaling even in absence of contact between the first electrically conductive element and the second electrically conductive element when one said elastic flexure or deformation of the membrane portion is of a degree at least equal to said substantially predetermined limit.

8. The pressure sensor according to claim 7, wherein the proximity or position detector is of an inductive type or else of a capacitive type or else of a magnetic type.

9. The pressure sensor according to claim 1, wherein the at least one detection component is selected from among resistive components, piezoresistive components, piezoelectric components.

10. The pressure sensor according to claim 1, wherein the circuit arrangement further comprises:
a second electrical circuit associated to the second face of the other one between the first body part and the second body part; and
connection means, which electrically connect the first electrical circuit to the second electrical circuit and extend at least in an axial direction of the sensor body.

11. The pressure sensor according to claim 10, wherein the connection means comprise at least one of:
a plurality of through holes of the other one of the first body part and the second body part, which extend axially between the respective first face and second face;
a plurality of passages or through openings of a layer of material which is set between the first face of the first body part and the first face of the second body part,
the connection means further comprising an electrically conductive material, which extends on the inside of each of the through holes and/or each of the passages or through openings and electrically connects the first electrical circuit to the second electrical circuit.

12. The pressure sensor according to claim 1, wherein an annular layer of sealing material is set between the first face of the first body part and the first face of the second body part, the first face of the first body part, the first face of the second body part and the annular layer of sealing material delimiting a cavity of the sensor body.

13. The pressure sensor according to claim 1, wherein the at least one of the first body part and the second body part has an axial cavity, closed by the membrane portion at its corresponding first face, the axial cavity being open at the corresponding second face of the at least one of the first body part (3') and the second body part (4'), for receiving the fluid the pressure of which is to be detected.

14. The pressure sensor according to claim 1, wherein the circuit arrangement is configured for generating one of:
a single signal including both said first information and said second information or signaling;
a first signal including said first information, and a second signal including said second information or signaling.

15. The pressure sensor according to claim 14, wherein the circuit arrangement is configured for identifying said first information and said second information or signaling in the single signal.

16. The pressure sensor according to claim 14, wherein the circuit arrangement is configured for combining the first signal and the second signal in a same single signal.

17. A pressure-detecting device, comprising a pressure sensor according to claim 1.

18. A pressure sensor for detecting the pressure of a fluid in a nominal working range, the pressure sensor having a sensor body that comprises at least one first body part and one second body part each having a first face and a second face opposite to one another,
wherein the first body part and the second body part are joined together in such a way that the first face of the first body part faces the first face of the second body part, at a distance therefrom;
wherein at least one of the first body part and the second body part includes a membrane portion, subject to elastic flexure or deformation towards the other one of the first body part and the second body part as a result of pressure of the fluid, the membrane portion defining at least part of the first face of the first body part or of the second body part;
wherein the pressure sensor has a circuit arrangement supported by the sensor body, which comprises at least one first electrical circuit that extends at least in part at the membrane portion and is configured at least for detecting one said elastic flexure or deformation through at least one respective detection component in order to provide first information representative of a measurement of a pressure comprised in said nominal working range;
wherein the first electrical circuit is associated to the first face of one of the first body part and the second body part, and the first face of the other one of the first body part and the second body part forms or has associated thereto at least one circuit element, prearranged for interacting with the first electrical circuit when one said elastic flexure or deformation of the membrane portion is of a degree at least equal to a substantially predetermined safety limit, to generate thereby second information or signaling representative of a pressure of the fluid which exceeds said nominal working range;
wherein the at least one circuit element comprises an element made of electrically conductive material, such as a resistive material or a metal material or a material with high electrical conductivity, with which at least one part of the first electrical circuit comes into contact following upon one said elastic flexure or deformation of the membrane portion of a degree at least equal to said substantially predetermined limit.

19. A pressure sensor for detecting the pressure of a fluid in a nominal working range, the pressure sensor having a sensor body that comprises at least one first body part and one second body part each having a first face and a second face opposite to one another, wherein the first body part and the second body part are joined together in such a way that the first face of the first body part faces the first face of the second body part, at a distance therefrom;

wherein at least one of the first body part and the second body part includes a membrane portion, subject to elastic flexure or deformation towards the other one of the first body part and the second body part as a result of pressure of the fluid, the membrane portion defining at least part of the first face of the first body part or of the second body part;

wherein the pressure sensor has a circuit arrangement supported by the sensor body, which comprises at least one first electrical circuit that extends at least in part at the membrane portion and is configured at least for detecting one said elastic flexure or deformation through at least one respective detection component in order to provide first information representative of a measurement of a pressure comprised in said nominal working range;

wherein the first electrical circuit is associated to the first face of one of the first body part and the second body part, and the first face of the other one of the first body part and the second body part forms or has associated thereto at least one circuit element, prearranged for interacting with the first electrical circuit when one said elastic flexure or deformation of the membrane portion is of a degree at least equal to a substantially predetermined safety limit, to generate thereby second information or signaling representative of a pressure of the fluid which exceeds said nominal working range;

wherein the at least one circuit element comprises a first electrically conductive element that provides, together with at least one second electrically conductive element associated to the first face to which also the first electrical circuit is associated, a proximity or position detector, the proximity or position detector being configured for generating said second information or signaling even in absence of contact between the first electrically conductive element and the second electrically conductive element when one said elastic flexure or deformation of the membrane portion is of a degree at least equal to said substantially predetermined limit.

* * * * *